(12) United States Patent
Mas Rosique et al.

(10) Patent No.: US 12,349,006 B2
(45) Date of Patent: Jul. 1, 2025

(54) COORDINATION OF EDGE APPLICATION SERVER RESELECTION USING EDGE CLIENT SUBNET

(71) Applicant: Telefonaktiebolaget LM Ericsson (publ), Stockholm (SE)

(72) Inventors: Maria Luisa Mas Rosique, Tres Cantos (ES); Attila Mihály, Dunakeszi (HU); Jan Backman, Kärna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 328 days.

(21) Appl. No.: 18/010,320

(22) PCT Filed: Jul. 22, 2021

(86) PCT No.: PCT/EP2021/070539
§ 371 (c)(1),
(2) Date: Dec. 14, 2022

(87) PCT Pub. No.: WO2022/033832
PCT Pub. Date: Feb. 17, 2022

(65) Prior Publication Data
US 2023/0337056 A1    Oct. 19, 2023

Related U.S. Application Data

(60) Provisional application No. 63/064,161, filed on Aug. 11, 2020.

(51) Int. Cl.
*H04W 28/08* (2023.01)
*H04W 40/02* (2009.01)

(52) U.S. Cl.
CPC ....... *H04W 28/0858* (2020.05); *H04W 40/02* (2013.01)

(58) Field of Classification Search
CPC ..... H04W 40/20; H04W 64/00; H04W 76/12; H04W 76/11; H04W 48/08; H04W 84/02;
(Continued)

(56) References Cited

U.S. PATENT DOCUMENTS

2018/0192390 A1    7/2018 Li et al.

OTHER PUBLICATIONS

"3GPP TR 23.748 V0.4.0", 3rd Generation Partnership Project; Technical Specification Group Services and System Aspects; Study on enhancement of support for Edge Computing in 5G Core network (5GC) (Release 17), Jun. 2020, pp. 1-189.
(Continued)

*Primary Examiner* — Jung Liu
*Assistant Examiner* — Jung-Jen Liu
(74) *Attorney, Agent, or Firm* — Murphy, Bilak & Homiller, PLLC

(57) ABSTRACT

A Session Management Function, SMF, (650) determines that a first data path for a Packet Data Unit, PDU, session between an application client (611) and a first edge application server, EAS, (681) should be relocated from a first local PDU session anchor, PSA, (631) and a first uplink classifier and branching point, ULCL/BP, (621) to a second PSA (632) and a second ULCL/BP (622). Further, the SMF (650) determines an edge client subnet, ECS, associated with the second PSA (632). Further, the SMF (650) sends, to an application function, AF, (670) associated with the application client (611), a notification of the relocation. The notification includes an identifier of the ECS and a data network access identifier, DNAI, associated with the second PSA (632). From the AF (670), the SMF (650) receives a response that includes an identifier of a second EAS (682) and the DNAI associated with the second PSA (632). Based on the response, the SMF (650) establishes a second data path for the PDU session between the application client
(Continued)

(611) and the second EAS (682) via the second PSA (632) and the second ULCL/BP (622).

20 Claims, 14 Drawing Sheets

(58) Field of Classification Search
CPC ... H04L 67/51; H04L 61/4541; H04L 67/141; H04L 61/4511; H04L 67/52
See application file for complete search history.

(56) References Cited

OTHER PUBLICATIONS

"3GPP TS 23.501 V16.5.0", 3rd Generation Partnership Project; Technical Specification Group Services and System Aspects; System architecture for the 5G System (5GS); Stage 2 (Release 16), Jul. 2020, pp. 1-441.
"3GPP TS 23.503 V15.5.0", 3rd Generation Partnership Project; Technical Specification Group Services and System Aspects; Policy and Charging Control Framework for the 5G System; Stage 2 (Release 15), Mar. 2019, pp. 1-41.
"Client Subnet in DNS Queries", Internet Engineering Task Force (IETF), Request for Comments: 7871, Category: Informational, ISSN: 2070-1721, May 2016, pp. 1-30.
"Domain names—Concepts and Facilities", Network Working Group, Request for Comments: 1034, Obsoletes: RFCs 882, 883, 973, Nov. 1987, pp. 1-55.
"Domain names—Implementation and Specification", Network Working Group, Request for Comments: 1035, Obsoletes: RFCs 882, 883, 973, Nov. 1987, pp. 1-55.
"Extension Mechanisms for DNS (EDNS(0))", Internet Engineering Task Force (IETF), Request for Comments: 6891, STD: 75, Obsoletes: 2671, 2673, Category: Standards Track, ISSN: 2070-1721, Apr. 2013, pp. 1-16.
"KI#2, New sol: Service Continuity at Edge Relocation with DNS triggered insertion of BP/ULCL and Edge PSA", 3GPP TSG-SA/WG2 Meeting #140E,S2-2004954, Electronic meeting, Aug. 19-Sep. 2, 2020, pp. 1-7.
"KI#2, New Solution: UE Agnostic EAS P address replacement for traffic subject to edge computing", SA WG2 Temporary Document, S2-2004416, (revision of S2-2004314), SA WG2 Meeting #139E, Jun. 1-12, 2020, pp. 1-10.
"Solution for KI#2: Eas change with reducing packet loss", SA WG2 Temporary Document, S2-2004118, (revision of S2~200xxxx), 3GPP TSG-WG SA2 Meeting #139E e-meeting, Elbonia, Jun. 1-12, 2020, pp. 1-6.
"Solution for KI#2: Edge relocation based on MPTCP", SA WG2 Temporary Document, S2-2004424, (revision of S2-20xxxx), SA WG2 Meeting #139, Elbonia, Jun. 13-17, 2020, pp. 1-8.
"3GPP TS 38.401 V15.6.0", 3rd Generation Partnership Project; Technical Specification Group Radio Access Network; NG-RAN; Architecture description (Release 15), Jul. 2019, pp. 1-46.
"3GPP TR 38.801 V14.0.0", 3rd Generation Partnership Project; Technical Specification Group Radio Access Network; Study on new radio access technology: Radio access architecture and interfaces (Release 14), Mar. 2017, pp. 1-91.
"3GPP TS 33.401 V15.8.0", 3rd Generation Partnership Project; Technical Specification Group Services and System Aspects; 3GPP System Architecture Evolution (SAE); Security architecture (Release 15), Jun. 2019, pp. 1-163.
"3GPP TS 23.502 V15.5.0", 3rd Generation Partnership Project; Technical Specification Group Services and System Aspects; Procedures for the 5G System; Stage 2 (Release 15), Mar. 2019, pp. 1-355.
"3GPP TS 23.501 V15.5.0", 3rd Generation Partnership Project; Technical Specification Group Services and System Aspects; System Architecture for the 5G System; Stage 2 (Release 15), Mar. 2019, pp. 1-241.
"ETSI TS 123 502 V16.5.0", 5G; Procedures for the 5G System (5GS) (3GPP TS 23.502 version 16.5.0 Release 16), Jul. 2020, pp. 1-597.

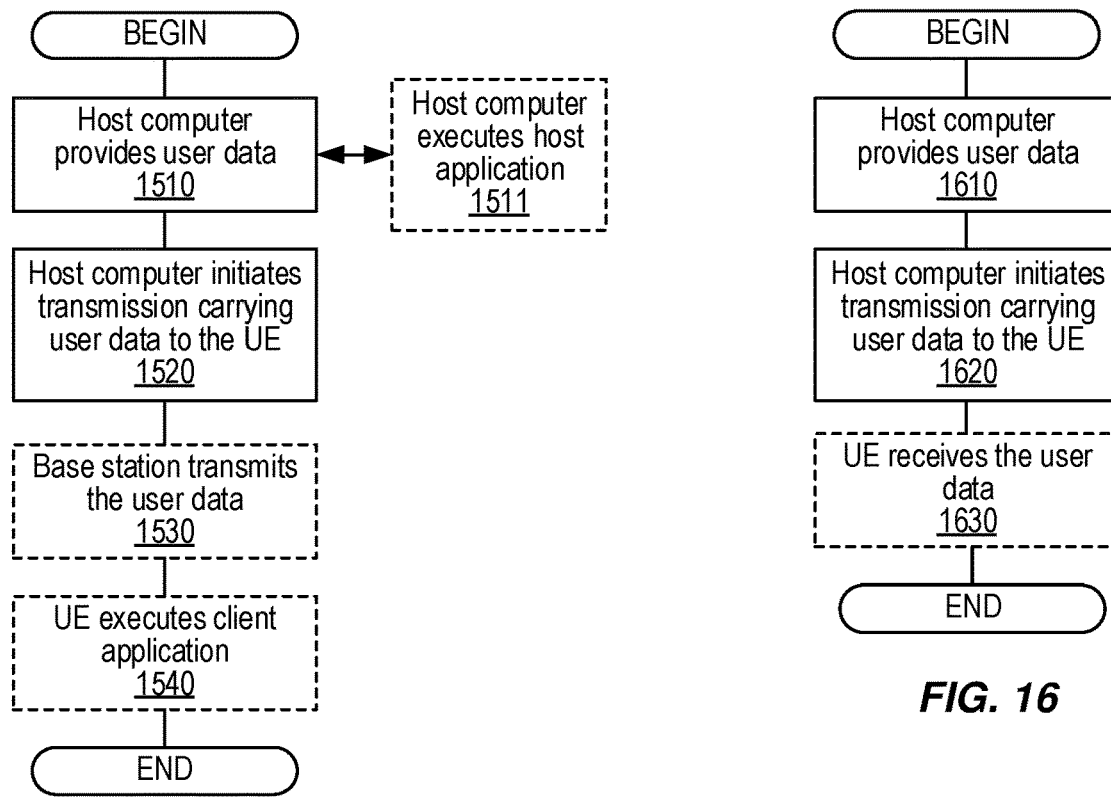
FIG. 15
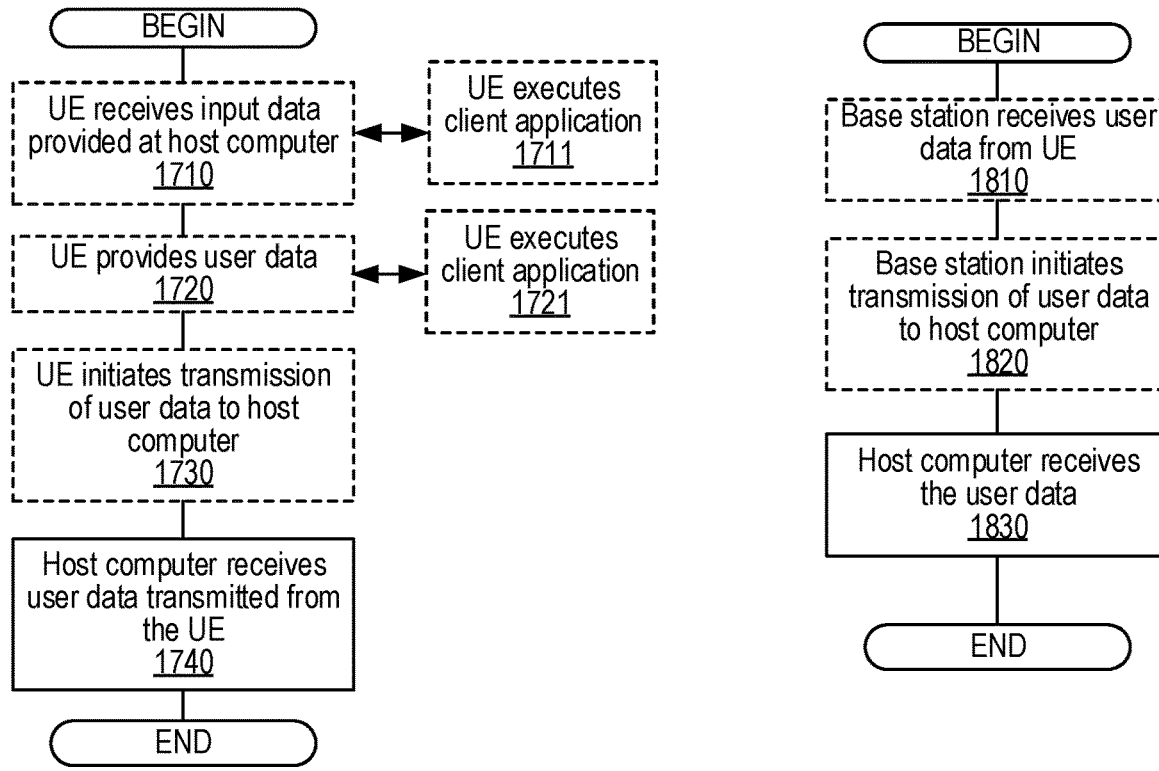
FIG. 17
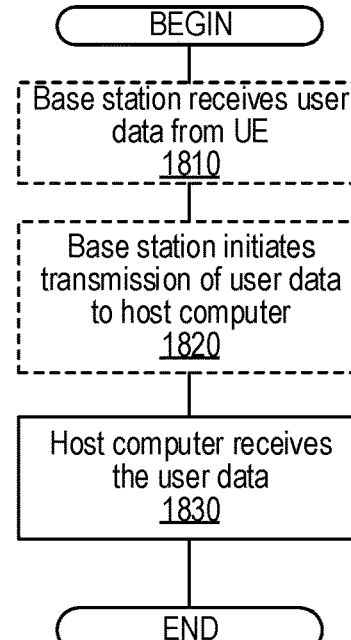
FIG. 16
FIG. 18

COORDINATION OF EDGE APPLICATION SERVER RESELECTION USING EDGE CLIENT SUBNET

TECHNICAL FIELD

The present application relates generally to the field of wireless communication networks, and more specifically to "edge computing" techniques that facilitate execution environments proximate to users and/or devices that provide and consume data, rather than in centralized, public network clouds.

BACKGROUND

The Domain Name System (DNS) is a hierarchical and decentralized naming system for computers, services, or other resources connected to the Internet or a private network. DNS associates various information with domain names assigned to each of the participating entities. Most prominently, it translates more readily-memorized domain names to the numerical IP addresses needed for locating and identifying computer services and devices with the underlying network protocols.

DNS was defined by Internet Engineering Task Force (IETF) in RFCs 1034 and 1035, which specify the technical functionality of its core database service as well as the data structures and data communication exchanges used in DNS, also referred to as the "DNS protocol." DNS is commonly viewed as an important part of the Internet Protocol Suite. Furthermore, DNS is the most commonly used mechanism for application clients to discover the IP address of applications in the internet. It allows users to handle application hostnames and have them translated into the IP address of the Application Server. Various DNS extension mechanisms have been defined in IETF RFC 6891.

Today, a DNS query can return different responses based on the perceived topological location of the user. DNS servers use the IP address of the incoming query to identify the user's location. Since most queries come from Intermediate Recursive Resolvers, the source address is that of the Recursive Resolver rather than of the query originator (e.g., user). To address the case of Recursive Resolvers that are not topologically close to the query originator, IETF RFC 7871 defines an EDNS0 (that is, a DNS extension according to RFC6891) option to convey network information that is relevant to the DNS message. In such case, the DNS query can carry sufficient network information about the originator (e.g., a client IP subnet) for the Authoritative Nameserver to tailor responses. RFC 7871 also provides for the Authoritative Nameserver to indicate the scope of network addresses for which the tailored answer is intended.

Currently the fifth generation ("5G") of cellular systems, also referred to as New Radio (NR), is being standardized within the Third-Generation Partnership Project (3GPP). NR is developed for maximum flexibility to support multiple and substantially different use cases.

These include enhanced mobile broadband (eMBB), machine type communications (MTC), ultra-reliable low latency communications (URLLC), side-link device-to-device (D2D), and several other use cases.

FIG. 1 illustrates a high-level view of an exemplary 5G network architecture, consisting of a Next Generation RAN (NG-RAN) 199 and a 5G Core (5GC) 198. NG-RAN 199 can include one or more gNodeB's (gNBs) connected to the 5GC via one or more NG interfaces, such as gNBs 100, 150 connected via interfaces 102, 152, respectively. More specifically, gNBs 100, 150 can be connected to one or more Access and Mobility Management Functions (AMFs) in the 5GC 198 via respective NG-C interfaces. Similarly, gNBs 100, 150 can be connected to one or more User Plane Functions (UPFs) in 5GC 198 via respective NG-U interfaces. Various other network functions (NFs) can be included in the 5GC 198, as described in more detail below.

In addition, the gNBs can be connected to each other via one or more Xn interfaces, such as Xn interface 140 between gNBs 100 and 150. The radio technology for the NG-RAN is often referred to as "New Radio" (NR). With respect the NR interface to UEs, each of the gNBs can support frequency division duplexing (FDD), time division duplexing (TDD), or a combination thereof. Each of the gNBs can serve a geographic coverage area including one more cells and, in some cases, can also use various directional beams to provide coverage in the respective cells.

NG-RAN 199 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region" which is defined in 3GPP TS 23.501 (v15.5.0). If security protection for CP and UP data on TNL of NG-RAN interfaces is supported, NDS/IP (3GPP TS 33.401 (v15.8.0)) shall be applied.

The NG RAN logical nodes shown in FIG. 1 (and described in 3GPP TS 38.401 (v15.6.0) and 3GPP TR 38.801 (v14.0.0)) include a Central Unit (CU or gNB-CU) and one or more Distributed Units (DU or gNB-DU). For example, gNB 100 includes gNB-CU 110 and gNB-DUs 120 and 130. CUs (e.g., gNB-CU 110) are logical nodes that host higher-layer protocols and perform various gNB functions such controlling the operation of DUs. A DU (e.g., gNB-DUs 120, 130) is a decentralized logical node that hosts lower layer protocols and can include, depending on the functional split option, various subsets of the gNB functions. As such, each of the CUs and DUs can include various circuitry needed to perform their respective functions, including processing circuitry, transceiver circuitry (e.g., for communication), and power supply circuitry.

A gNB-CU connects to one or more gNB-DUs over respective F1 logical interfaces, such as interfaces 122 and 132 shown in FIG. 1. However, a gNB-DU can be connected to only a single gNB-CU. The gNB-CU and connected gNB-DU(s) are only visible to other gNBs and the 5GC as a gNB. In other words, the F1 interface is not visible beyond gNB-CU.

Another change in 5G networks (e.g., in 5GC) is that traditional peer-to-peer interfaces and protocols found in earlier-generation networks are modified and/or replaced by a Service Based Architecture (SBA) in which Network Functions (NFs) provide one or more services to one or more service consumers. This can be done, for example, by Hyper Text Transfer Protocol/Representational State Transfer (HTTP/REST) application programming interfaces (APIs). In general, the various services are self-contained functionalities that can be changed and modified in an isolated manner without affecting other services. This SBA model also adopts principles like modularity, reusability, and self-containment of NFs, which can enable deployments to take advantage of the latest virtualization and software technologies.

Furthermore, the services are composed of various "service operations", which are more granular divisions of the overall service functionality. The interactions between service consumers and producers can be of the type "request/response" or "subscribe/notify". In the 5G SBA, network repository functions (NRF) allow every network function to discover the services offered by other network functions, and Data Storage Functions (DSF) allow every network function to store its context.

It is expected that 5GC will support edge computing (EC), which enables operator and third-party services to be hosted close to a UE's access point of attachment. This can facilitate efficient service delivery through the reduced end-to-end latency and load on the transport network. The 5GC can select a user plane function (UPF) close to the UE and executes the traffic steering from the UPF to the local Data Network via an N6 interface. Both UPF and N6 are discussed in more detail below.

3GPP TR 23.748 (V0.4.0) discusses architectural enhancements that may be needed to support EC in 5GC for 3GPP Rel-17. One of the key issues is the discovery of the IP address of application servers (AS) deployed in the EC environment that is closest to the user location. These are also referred to as Edge AS (EAS). Several solutions have been already been proposed targeting the various EC connectivity models, with most of these solutions using DNS for EAS Discovery due to its familiarity and expected adoption by application developers. UE operating systems (OS) already today include a DNS Stub resolver and the DNS response can be tuned to an IP location.

The goal in these solutions is then to provide in a DNS Query enough information about the IP topological location of the user to facilitate the DNS resolution, and then make sure that the EAS selection and the 5GC connectivity for the Application (e.g. the PDU Session Anchor, PSA, for the application traffic) are aligned to provide an efficient data path for the application traffic routing.

In general, DNS should provide the IP address of an EAS that is closest to the UE's PSA. However, the UE's PSA may change occasionally, such as due to UE mobility. In such cases, the reselection of a new EAS that is closer to the user than the current EAS is conditioned on when the UE will send a next DNS Query. Applications can subscribe to network notifications of user plane (UP) path changes for UE, e.g., due to UE mobility. These notifications can trigger the reselection of the EAS on the Application Server side but require the mobile network operator (MNO) to disclose various information concerning locations (e.g., IP address) of accesses to an external data network (DN).

However, new EC solutions proposed for EAS discovery allow the 5GC to dynamically insert uplink classifier and branching point (ULCL/BP) and local PSA triggered by user DNS query for a fully qualified domain name (FQDN) associated with a service, without the MNO sharing various topology information with the application service provider. This can create various problems, difficulties, and/or issues for deployment of EC solutions.

SUMMARY

Accordingly, exemplary embodiments of the present disclosure address these and other problems, issues, and/or difficulties that can occur at failover, thereby enabling the otherwise-advantageous deployment of edge computing (EC) solutions in relation to a 5G network.

Some embodiments of the present disclosure include methods (e.g., procedures) for a session management function (SMF) of a communication network (e.g., 5GC).

These exemplary methods can include determining that a first data path, for a PDU session between an application client and a first edge application server (EAS), should be relocated from a first local PDU session anchor (PSA) and a first uplink classifier and branching point (ULCL/BP) to a second PSA and a second ULCL/BP. These exemplary methods can also include determining an edge client subnet (ECS) associated with the second PSA. These exemplary methods can also include sending a notification of the relocation to an application function (AF) associated with the applicant client. The notification can include an identifier of the ECS and a data network access identifier (DNAI) associated with the second PSA. These exemplary methods can also include receiving, from the AF, a response that includes an identifier of a second EAS and the DNAI associated with the second PSA. These exemplary methods can also include, based on the response, establishing a second data path for the PDU session between the application client and the second EAS via the second PSA and the second ULCL/BP.

In some embodiments, these exemplary methods can also include sending, to the AF, an identifier of the second data path. In some embodiments, these exemplary methods can also include initiating a timer upon establishing the second data path, maintaining the first data path to the first EAS while the timer is running, and removing the first data path to the first EAS upon expiration of the timer.

In some embodiments, the DNAI can have a value that indicates that the ECS is included in the notification and should be used by the AF to select the second EAS. In some embodiments, determining that the first data path should be relocated can be based on a domain name service (DNS) query by the application client. In some embodiments, the first and second EAS can be associated with respective first and second ranges of IP addresses, associated with an application server, that are managed together.

In some embodiments, such as when direct SMF-AF communication is not possible, the notification can be sent to the AF via a network exposure function (NEF) in the communication network, and the response can be received from the AF (e.g., in block 840) via the NEF.

Other embodiments include methods (e.g., procedures) for an application function (AF) in a communication network (e.g., 5GC).

These exemplary methods can include receiving, from a session management function (SMF) in the communication network, a notification of a relocation of a first data path, for a PDU session between an application client and a first edge application server (EAS), from a first local PDU session anchor (PSA) and a first uplink classifier and branching point (ULCL/BP) to a second PSA and a second ULCL/BP. The notification can include an identifier of an edge client subnet (ECS) associated with the second PSA and a data network access identifier (DNAI) associated with the second PSA. These exemplary methods can also include determining a second EAS based on the ECS. These exemplary methods can also include sending, to the SMF, a response that includes an identifier of a second EAS and the DNAI associated with the second PSA.

In some embodiments, these exemplary methods can also include receiving, from the SMF, an identifier of the second data path.

In some embodiments, the DNAI can have a value that indicates that the ECS is included in the notification and should be used by the AF to select the second EAS. In some embodiments, determining the second EAS can include sending a domain name service (DNS) query that includes the identifier of the ECS. In such embodiments, the identifier of the second EAS can include an IP address of the second EAS received in response to the DNS query.

In some embodiments, the first and second EAS can be associated with respective first and second ranges of IP addresses, associated with an application server, that are managed together. In some embodiments, such as when direct SMF-AF communication is not possible, the notification can be received from the SMF via a network exposure function (NEF) in the communication network, and the response can be sent to the SMF via the NEF.

Other exemplary embodiments include SMFs or AFs (or network nodes hosting or implementing the same) that are configured to perform the operations corresponding to any of the exemplary methods described herein. Other exemplary embodiments also include non-transitory, computer-readable media storing computer-executable instructions that, when executed by processing circuitry associated with such SMFs and AFs, configure the same to perform operations corresponding to any of the exemplary methods described herein.

These and other objects, features, and advantages of the present disclosure will become apparent upon reading the following Detailed Description in view of the Drawings briefly described below.

BRIEF DESCRIPTION OF THE DRAWINGS

FIGS. 15-18 are flow diagrams of exemplary methods (e.g., procedures) for transmission and/or reception of user data, according to various exemplary embodiments of the present disclosure.

DETAILED DESCRIPTION

Figure 1:
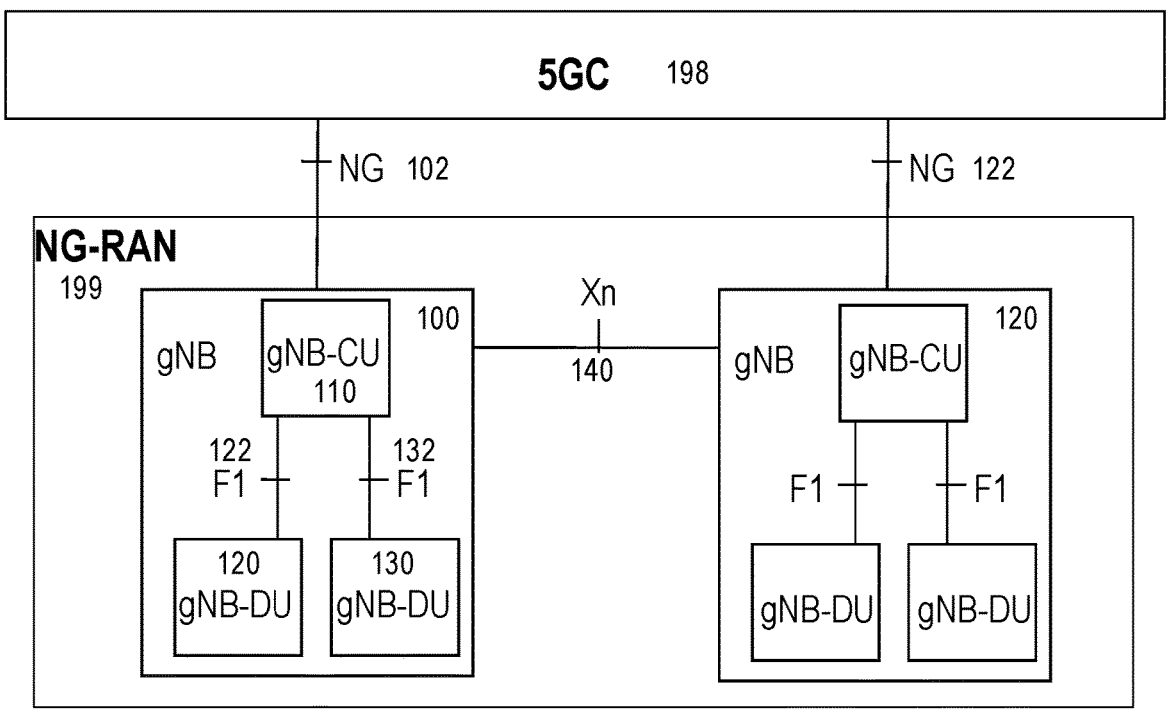
FIGS. 1-3 illustrate various aspects of an exemplary 5G network architecture.

Exemplary embodiments briefly summarized above will now be described more fully with reference to the accompanying drawings. These descriptions are provided by way of example to explain the subject matter to those skilled in the art and should not be construed as limiting the scope of the subject matter to only the embodiments described herein. More specifically, examples are provided below that illustrate the operation of various embodiments according to the advantages discussed above.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objects, features and advantages of the disclosed embodiments will be apparent from the following description.

Furthermore, the following terms are used throughout the description given below:

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (JAB) node (or component thereof such as MT or DU), a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), etc. A core network node can also be a node that implements a particular core network function (NF), such as an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Unless otherwise noted, the term "wireless device" is used interchangeably herein with "user equipment" (or "UE" for short). Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, mobile terminals (MTs), etc.

Radio Node: As used herein, a "radio node" can be either a "radio access node" (or equivalent term) or a "wireless device."

Network Node: As used herein, a "network node" is any node that is either part of the radio access network (e.g., a radio access node or equivalent term) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Node: As used herein, the term "node" (without any prefix) can be any type of node that is capable of operating in or with a wireless network (including a RAN and/or a core network), including a radio access node (or equivalent term), core network node, or wireless device.

Service: As used herein, the term "service" refers generally to a set of data, associated with one or more applications, that is to be transferred via a network with certain specific delivery requirements that need to be fulfilled in order to make the applications successful.

Component: As used herein, the term "component" refers generally to any component needed for the delivery of a service. Examples of component are RANs (e.g., E-UTRAN, NG-RAN, or portions thereof such as eNBs, gNBs, base stations (BS), etc.), CNs (e.g., EPC, 5GC, or portions thereof, including all type of links between RAN and CN entities), and cloud infrastructure with related resources such as computation, storage. In general, each component can have a "manager", which is an entity that can collect historical information about utilization of resources as well as provide information about the current and the predicted future availability of resources associated with that component (e.g., a RAN manager).

Note that the description given herein focuses on a 3GPP cellular communications system and, as such, 3GPP terminology or terminology similar to 3GPP terminology is generally used. However, the concepts disclosed herein are not limited to a 3GPP system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from the concepts, principles, and/or embodiments described herein.

In addition, functions and/or operations described herein as being performed by a wireless device or a network node may be distributed over a plurality of wireless devices and/or network nodes. Furthermore, although the term "cell" is used herein, it should be understood that (particularly with respect to 5G NR) beams may be used instead of cells and, as such, concepts described herein apply equally to both cells and beams.

As briefly mentioned above, new EC solutions proposed for EAS discovery allow the 5GC to dynamically insert uplink classifier and branching point (ULCL/BP) and local PSA triggered by user DNS query for a fully qualified domain name (FQDN) without the MNO sharing various topology information with the Application service provider. This can create various problems, difficulties, and/or issues for deployment of EC solutions, which is discussed in more detail below.

Figure 2:
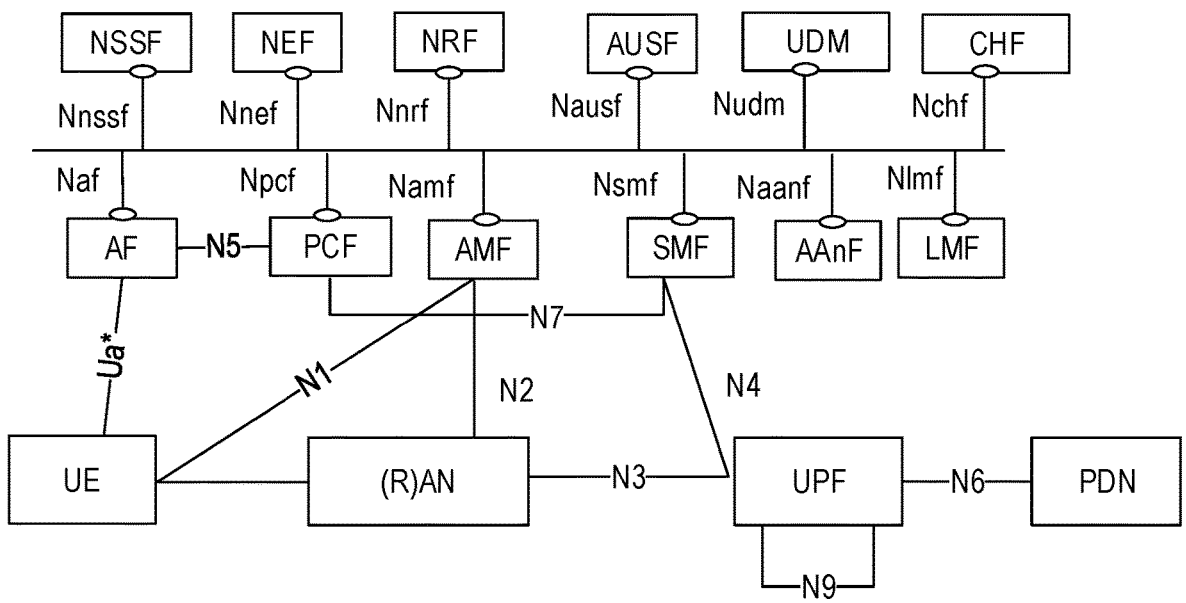

FIG. 2 shows an exemplary non-roaming 5G reference architecture with service-based interfaces and various 3GPP-defined NFs within the Control Plane (CP). These include the following NFs, with additional details provided for those most relevant to the present disclosure:

Application Function (AF, with Naf interface) interacts with the 5GC to provision information to the network operator and to subscribe to certain events happening in operator's network. An AF offers applications for which service is delivered in a different layer (i.e., transport layer) than the one in which the service has been requested (i.e. signaling layer), the control of flow resources according to what has been negotiated with the network. An AF communicates dynamic session information to PCF (via N5 interface), including description of media to be delivered by transport layer.

Policy Control Function (PCF, with Npcf interface) supports unified policy framework to govern the network behavior, via providing PCC rules (e.g., on the treatment of each service data flow that is under PCC control) to the SMF via the N7 reference point. PCF provides policy control decisions and flow based charging control, including service data flow detection, gating, QoS, and flow-based charging (except credit management) towards the SMF. The PCF receives session and media related information from the AF and informs the AF of traffic (or user) plane events.

User Plane Function (UPF)— supports handling of user plane traffic based on the rules received from SMF, including packet inspection and different enforcement actions (e.g., event detection and reporting). UPFs communicate with the RAN (e.g., NG-RNA) via the N3 reference point, with SMFs (discussed below) via the N4 reference point, and with an external packet data network (PDN) via the N6 reference point. The N9 reference point is for communication between two UPFs.

Session Management Function (SMF, with Nsmf interface) interacts with the decoupled traffic (or user) plane, including creating, updating, and removing Protocol Data Unit (PDU) sessions and managing session context with the User Plane Function (UPF), e.g., for event reporting. For example, SMF performs data flow detection (based on filter definitions included in PCC rules), online and offline charging interactions, and policy enforcement.

Charging Function (CHF, with Nchf interface) is responsible for converged online charging and offline charging functionalities. It provides quota management (for online charging), re-authorization triggers, rating conditions, etc. and is notified about usage reports from the SMF. Quota management involves granting a specific number of units (e.g. bytes, seconds) for a service. CHF also interacts with billing systems.

Access and Mobility Management Function (AMF, with Namf interface) terminates the RAN CP interface and handles all mobility and connection management of UEs (similar to MME in EPC). AMFs communicate with UEs via the N1 reference point and with the RAN (e.g., NG-RAN) via the N2 reference point.

Network Exposure Function (NEF) with Nnef interface—acts as the entry point into operator's network, by securely exposing to AFs the network capabilities and events provided by 3GPP NFs and by providing ways for the AF to securely provide information to 3GPP network.

Network Repository Function (NRF) with Nnrf interface—provides service registration and discovery, enabling NFs to identify appropriate services available from other NFs.

Network Slice Selection Function (NSSF) with Nnssf interface—a "network slice" is a logical partition of a 5G network that provides specific network capabilities and characteristics, e.g., in support of a particular service. A network slice instance is a set of NF instances and the required network resources (e.g. compute, storage, communication) that provide the capabilities and characteristics of the network slice. The NSSF enables other NFs (e.g., AMF) to identify a network slice instance that is appropriate for a UE's desired service.

Authentication Server Function (AUSF) with Nausf interface—based in a user's home network (HPLMN), it performs user authentication and computes security key materials for various purposes.

Location Management Function (LMF) with Nlmf interface—supports various functions related to determination of UE locations, including location determination for a UE and obtaining any of the following: DL location measurements or a location estimate from the UE; UL location measurements from the NG RAN; and non-UE associated assistance data from the NG RAN.

The Unified Data Management (UDM) function supports generation of 3GPP authentication credentials, user identification handling, access authorization based on subscription data, and other subscriber-related functions. To provide this functionality, the UDM uses subscription data (including authentication data) stored in the 5GC unified data repository (UDR). In addition to the UDM, the UDR supports storage and retrieval of policy data by the PCF, as well as storage and retrieval of application data by NEF.

The services in 5GC will likely be built in a stateless way, such that the business logic and data context will be separated. For example, the services can store their context externally in a proprietary database. This can facilitate various cloud infrastructure features like auto-scaling or auto-healing. The NRF allows every NF to discover the services offered by other NFs, and Data Storage Functions (DSF) allow every NF to store its context. In addition, the NEF provides exposure of capabilities and events of the 5GC to application functions (AFs) within the 5GC and outside of the 5GC. For example, NEF provides a service that allows an AF to provision specific subscription data (e.g., expected UE behavior) for various UEs.

An MNO's 5GC will typically be deployed in a redundant manner with a least two physically separate sites with relatively independent hardware infrastructure such as connectivity, power, etc. Large MNOs may operate more than two redundant sites. Each site may also include various levels of intra-site redundancy, both for hardware infrastructure (e.g., routers) and for functionality (e.g., NFs). The purpose of inter-site redundancy is to avoid service interruptions by enabling quick service restoration when a full 5GC site is malfunctioning and/or is unreachable. The purpose of intra-site redundancy is to avoid service interruptions by enabling quick service restoration when individual nodes in a site are is malfunctioning and/or are unreachable.

Figure 3:
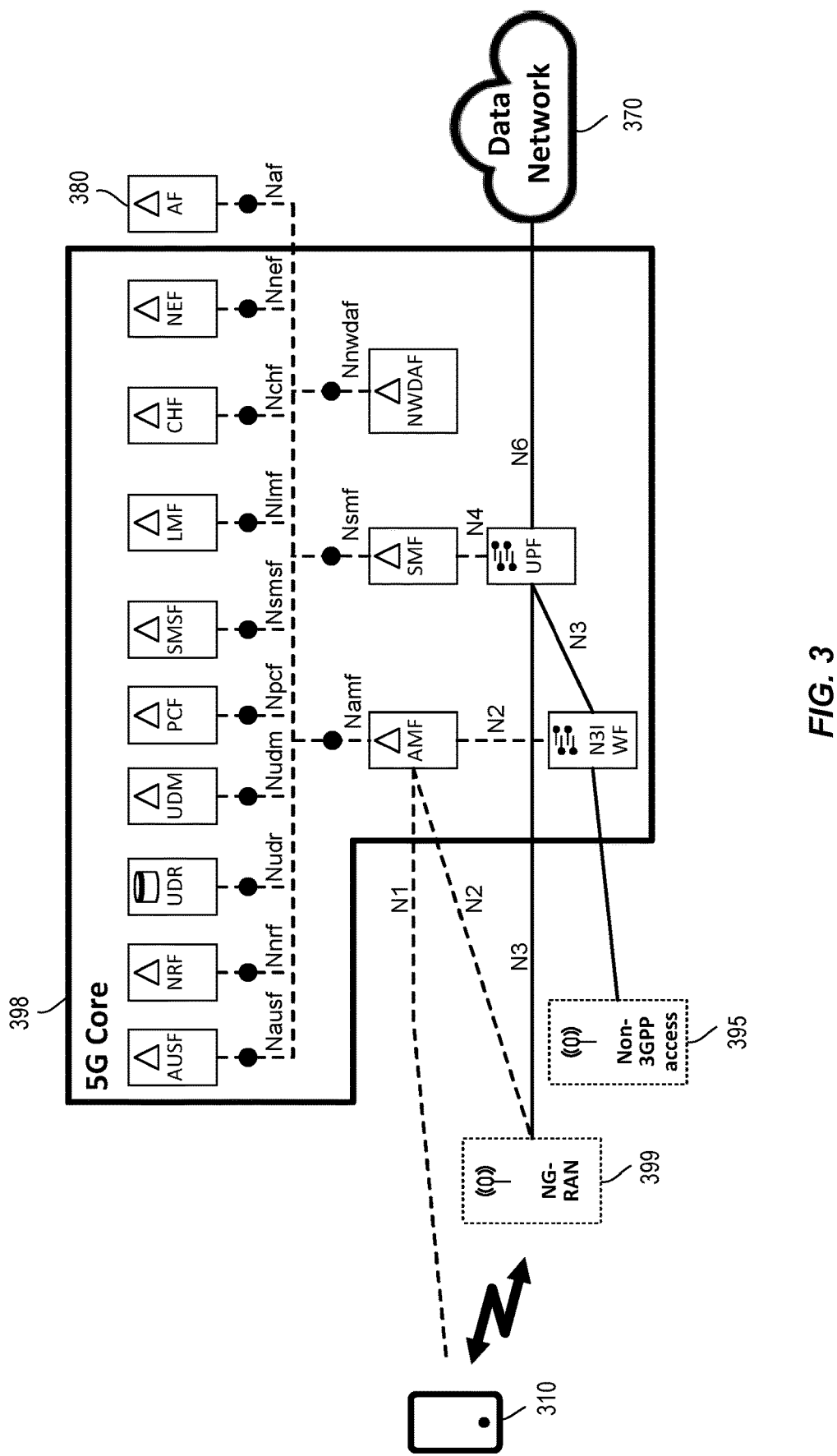

FIG. 3 illustrates another high-level view of an exemplary 5G network architecture. Similar to the architecture shown in FIG. 1, the architecture shown in FIG. 3 includes a Next Generation RAN (NG-RAN) 399 and a 5G Core (5GC) 398. In addition, FIG. 3 shows an external data network 370 (e.g., the Internet) and a non-3GPP access network 395 (e.g., wireless LAN) connected to 5GC 398. In this arrangement, UE 310 can communicate with data network 370 via NG-RAN 399 and 5GC 398, e.g., based on the NR radio interface and higher-layer protocols.

FIG. 3 also shows that 5GC 398 comprises various network functions (NFs), including many of those shown in FIG. 2 and described above. Application function (AF) 380 is shown separately from 5GC 398 in FIG. 3. In addition, 5GC 398 includes the following NFs:

Network Data Analytics Function (NWDAF) with Nnwdaf interface—provides network analytics information (e.g., statistical information of past events and/or predictive information) to other NFs on a network slice instance level.

SMS Function (SMSF) with Nsmsf interface—activates and deactivates short message service for a user and sends SMS payload.

As mentioned above, it is expected that 5GC will support edge computing (EC), which enables operator and third-party services to be hosted close to a UE's access point of attachment. This can facilitate efficient service delivery through the reduced end-to-end latency and load on the transport network. The 5GC can select a user plane function (UPF) close to the UE and executes the traffic steering from the UPF to the local Data Network via the N6 interface. 3GPP TS 23.501 section 5.13 defines several enablers for EC, including:

User plane (re)selection: 5GC (re)selects UPF to route the user traffic to the local DN.

Local Routing and Traffic Steering: the 5G Core Network selects the traffic to be routed to the applications in the local DN, which includes the use of a single PDU Session with multiple PDU Session Anchors (i.e., ULCL/IP v6 multi-homing).

An AF may influence UPF (re)selection and traffic routing via PCF or NEF as described further below.

In addition, 3GPP TR 23.748 section 4.2 defines the following EC connectivity models:

Distributed Anchor Point: the PDU Session anchor (PSA) is moved far out in the network, to the local sites. It is the same for all the user PDU session traffic. Re-anchoring (e.g., as defined by 3GPP for session and service continuity modes 2 and 3, SSC2 and SSC3) is used to optimize traffic routing for all applications when moving long distances.

Session Breakout: The PDU session has a PDU Session anchor in a central site and a PDU Session anchor in the local site. Only one of them provides the IP anchor point. The Edge Computing application traffic is selectively diverted to the local PDU Session anchor using UL Classifier or multihoming BP technology. Re-anchoring of the local PDU Session anchor is used to optimize traffic routing for locally diverted traffic as the user moves.

Multiple PDU sessions: EC applications use a specific PDU session with the PDU Session anchor in the local site. The rest of applications use a PDU Session with a central PDU Session anchor. Re-anchoring (e.g., as defined for SSC2 and SSC3) is used to optimize traffic routing for Edge Computing applications as the user moves.

Figure 4:
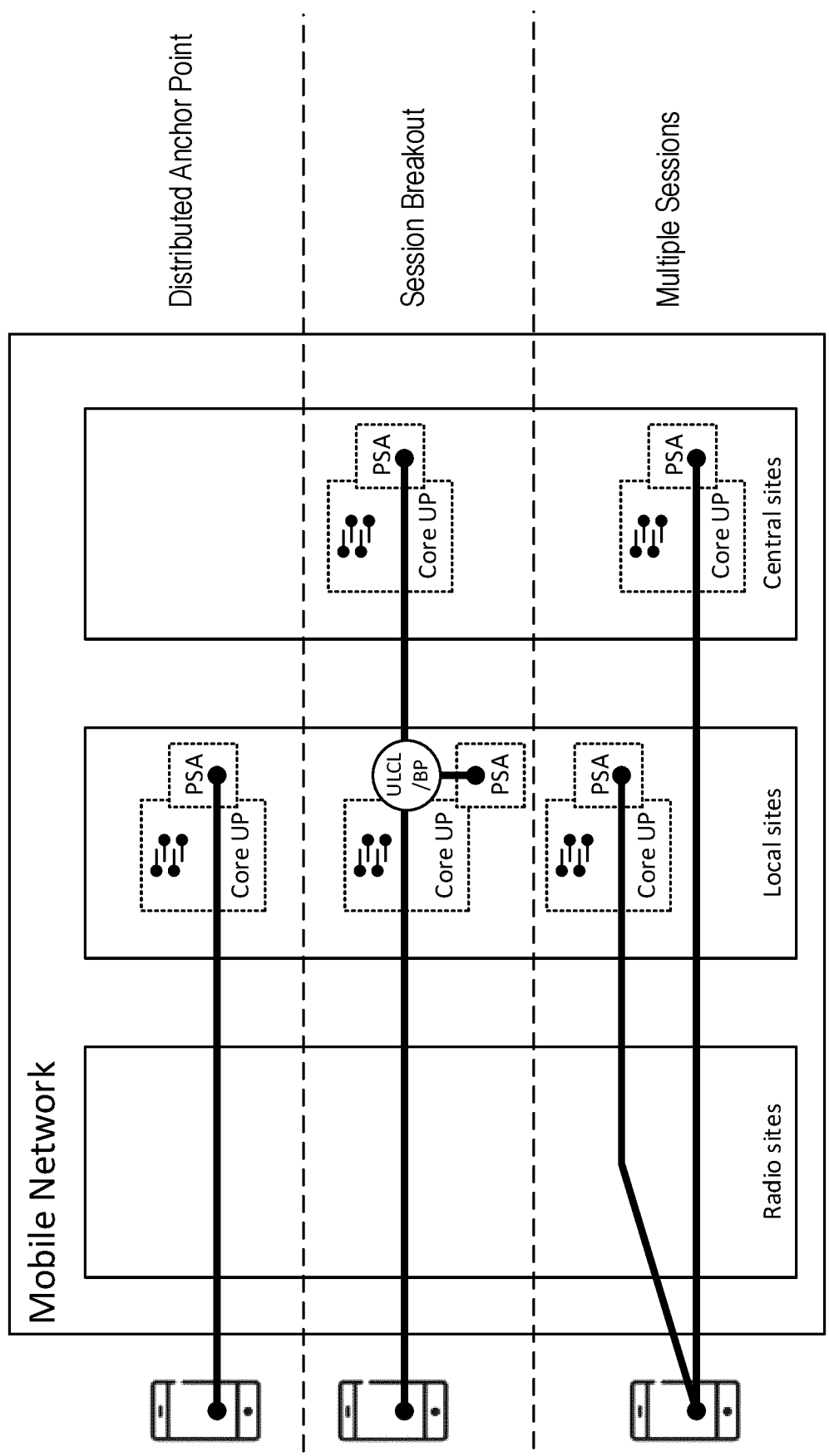
FIG. 4 is an exemplary network diagram that illustrates three edge computing (EC) connectivity models, as defined in 3GPP TR 23.748.

FIG. 4 is an exemplary network diagram that illustrates the three EC connectivity models defined in 3GPP TR 23.748.

An AF can also have various influence on traffic routing. In particular, an AF may send requests to influence SMF routing decisions for traffic of PDU Session. The AF requests may influence UPF (re)selection and allow routing user traffic to a local access to a DN. The location of the local access to the DN is identified by a DN Access Identifier (DNAI). The AF may issue requests on behalf of applications not owned by the PLMN serving the UE. If MNO does not allow an AF to access the 5GC directly, the AF can use the NEF to interact with the 5GC.

The AF may be responsible for (re)selection or relocation of the applications within the local DN. Such functionality is not part of 5GC but of the application layer. For this purpose, the AF may request notifications about events related to PDU Sessions, such as PSA changes. AF requests can be sent to the PCF (for specific on-going PDU Sessions of individual UEs, if an AF is allowed to interact directly with the 5GC NFs) or via the NEF. The AF requests that target existing or future PDU Sessions of the UE(s) are sent via the NEF and may target multiple PCF(s). The PCF(s) transform(s) the AF requests into policies that apply to PDU Sessions.

When the AF has subscribed to UP path management event notifications from SMF(s) (including notifications on how to reach a GPSI over N6), such notifications are sent by SMF either directly to the AF or via a NEF (without involving the PCF). 3GPP TS 23.502 (V15.5.0) section 4.6.3 the related procedures and the role of the NFs involved in these activities.

AF requests can include, but are not limited to, the following information, as defined in Table 6.5.7-1 of 3GPP TS 23.501:

Traffic Description: Defines the target traffic to be influenced, represented by the combination of DNN and optionally S-NSSAI, and application identifier or traffic filtering information. (Mandatory).

Potential Locations of Applications: Indicates potential locations of applications, represented by a list of DNAI(s). (Conditional: may be absent only if the request is for subscription to notifications).

Information on AF subscription to corresponding SMF events: Indicates whether the AF subscribes to change of UP path of the PDU Session and the parameters of this subscription. (Optional).

DNAI is mandatory in the AF influence requests and in the SMF notifications. The Service Provider needs to understand the IP location that the DNAI represents to influence the routing for an efficient data path to the ASs. This is assumed to happen outside 3GPP (e.g., under a service level agreement, SLA) and requires that the MNO shares the IP location of the network accesses to the DN.

3GPP TR 23.748 discusses architectural enhancements that may be needed to support EC in 5GC for 3GPP Rel-17. One of the key issues is the discovery of the IP address of application servers (AS) deployed in the EC environment that is closest to the user location. These are also referred to as Edge AS (EAS). Several solutions have been already been proposed targeting the connectivity models for Edge Computing, described above.

Most of these solutions propose DNS for EAS Discovery, as this is commonly used to discover IP addresses and will be more easily adopted by application developers. UE operating systems (OS) already include a DNS Stub resolver, and as described above, a DNS response can be tuned to an IP location.

The goal in these solutions is then to provide in a DNS Query enough information about the IP topological location of the user to facilitate the DNS resolution, and then make sure that the EAS selection and the 5GC connectivity for the Application (e.g. the PDU Session Anchor, PSA, for the application traffic) are aligned to provide an efficient data path for the application traffic routing.

According to 3GPP TR 23.748, when multiple sessions or distributed anchor connectivity models are used, existing Rel-16 features provide most of the necessary functionality. But solutions can get more complex for session breakout. Various solutions (e.g., labelled 3, 6, 9, 11, and 22 in 3GPP TR 23.748) propose some DNS handling within the 5GC (or coordinated with 5GC) to achieve alignment between DNS AS resolution and the 5GC connectivity for the application traffic.

Figure 5:
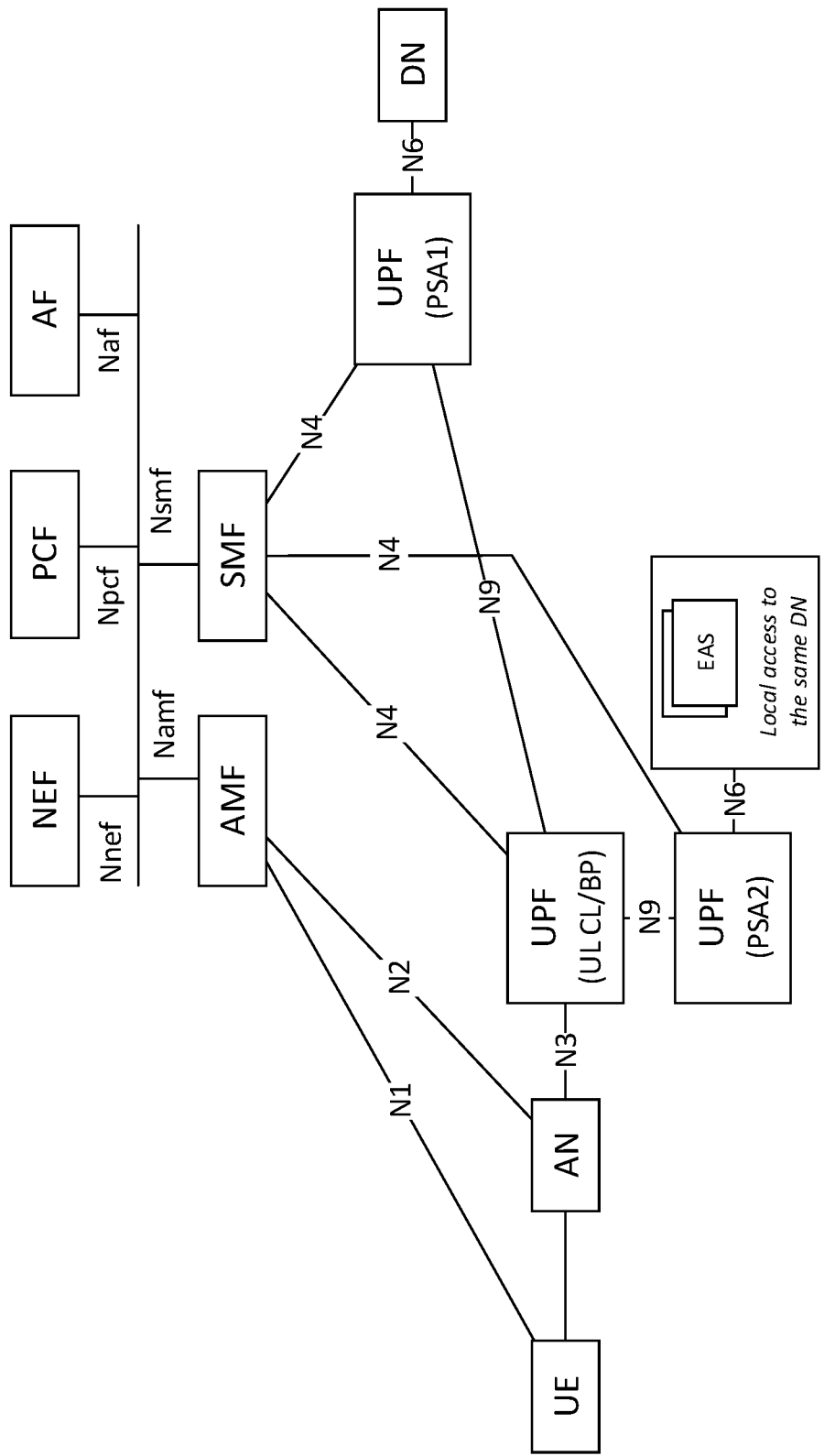
FIG. 5 shows an exemplary network architecture in which a UE can access an EAS via a UPFs with UL CL/BP and local PSA.

In particular, these solutions allow inserting an UL CL/BP and local PSA in the PDU Session just when it becomes needed, right before the application traffic starts (i.e., when the UE issues a DNS Query for the EC application). The network is more efficient as an ULCL/BP function needs to handle of the PDU sessions traffic, and not only that that is locally steered. FIG. 5 shows an exemplary network architecture in which a UE can access an EAS via a UPF with UL CL/BP and a UPF with a local PSA (i.e., PSA2). In the architecture of FIG. 5, the UE accesses the network via an access node (AN) and thereby has connectivity to the UPFs, i.e., UPF (ULCL/BP), UPF (PSA1), and UPF (PSA2). The UPF with PSA2 is connected via the UPF with PSA1 to the data network (DN). Further, FIG. 5 illustrates elements of the 5GC, namely an SMF, an AMF, an AF, an NEF 580, and a PCF. The UE may implement an application client.

In addition, these solutions allow aligning AS selection and 5GC connectivity in session breakout scenarios without receiving AF routing information, in principle without using DNAIs. Although AF input can assist 5GC to select better PSA candidates for breakout points, this is not really needed so that the SLA information exchange can be reduced to the IPs of the ASs. Note that applications usually exchange control signaling as well as application data. For example, this signaling can be used to instruct the application client during an AS change procedure. The AS IP received in the DNS response might not be the only destination in the Edge DN to which the application client will be sending traffic. The application client can get additional addresses via this signaling, e.g., similar to HTTP redirect. To guarantee all traffic destinations are steered in UL CL/BP to the correct PSA, the Service Provider should provide the AS IPs that need to be steered together (e.g., the information in the DNS response is insufficient).

In general, DNS should provide the IP address of an EAS that is closest to the UE's PSA. However, the UE's PSA may change occasionally, such as due to UE mobility. In such cases, the reselection of a new EAS that is closer to the user than the current EAS is conditioned on when the UE will send next DNS Query. This will happen some undetermined time after the PDU Session update has happened and is based on the time-to-live (TTL) of the previous DNS response, the type of session re-anchoring, whether the application client is aware (e.g. getting a new IP connection) of the re-anchoring, etc.

Applications can subscribe to network notifications of user plane (UP) path changes for UE, e.g., due to UE mobility. These notifications can trigger the reselection of the EAS on the Application Server side but require the mobile network operator (MNO) to disclose various information (e.g., DNAIs) concerning locations (e.g., IP address) of accesses to the external DN.

However, new EC solutions proposed for EAS discovery allow the 5GC to dynamically insert uplink classifier and branching point (ULCL/BP) and local PSA to allow for breaking out and injecting traffic selectively to and from AFs on the UP path before the IP anchor for a PDU session (e.g., UPF PSA1 shown in FIG. 5). This can be triggered by user DNS query for a fully qualified domain name (FQDN). However, these EC solutions do not require the MNO to share various topology information with an application service provider. This can create various problems, difficulties, and/or issues for network notifications for UP path change, which require such information to trigger and coordinate a potential EAS reselection from the AS side.

Embodiments of the present disclosure address these and other problems, issues, and/or difficulties by enhancing current 3GPP-defined 5GC procedures for sending UP Path Update event notifications to an application via an AF. For example, when an SMF decides to update a UE's PDU Session to reallocate the Edge, the SMF provides a corresponding edge client subnet (ECS) to the AF in the notification. The provided ECS can be similar to the one used in DNS queries based on RFC 7871. By this technique, the application layer has meaningful information for AS reselection, which is of same type that is used also for DNS-based EAS selection. By returning a selected EAS in the notification response, the SMF can adapt the PDU session (e.g., steering filters and routing policies of the session breakout) to the selection.

These embodiments can provide various benefits and/or advantages. For example, such techniques enable coordination of UP path changes on the network side and the reselection of the EAS on the AS side, while not requiring that the MNO to disclose network topology, such as (IP) locations of the different accesses to the DN identified by DNAIs Since there is no need to wait for a new DNS query from the UE side for AS selection, this improved coordination can accelerate reselection of an EAS at edge re-allocation due to UP path change for MNOs that do not want to disclose in advance the (IP) locations of the network accesses to the DN. The notification of the PDU Session update can trigger AS re-selection at the server side. Also, the UE DNS cache may be used for some time.

Furthermore, such embodiments facilitate simpler and more flexible SLAs between MNOs and Service Providers, due to less information needing to be exchanged. An SLA does not need to be updated when the MNO modifies its network deployment, since the MNO is not required to disclose to the Service Provider in advance the (IP) locations of the network accesses to the DN. Moreover, the path update notifications provide meaningful information that the application layer can use to adapt the AS selection to the user (IP) location.

In addition, a notification acknowledgement can provide information that allows setting 5GC connectivity to match the AS selected at the application layer. This complements the solution for dynamic insertion of ULCL/BP and Local PSA triggered by DNS, especially when the SMF is the receiver of the DNS traffic. Even so, the solution also works well with other deployments of DNS handling in 5GC.

At a high level, when an SMF decides to update a UE's PDU Session to reallocate the Edge, an SMF provides a corresponding edge client subnet (ECS) to the AF in a notification about the UP path change for the UE. The provided ECS can be similar to the one used in DNS queries based on RFC 7871 (which refers to "ECS" synonymously as "EDNS Client Subnet"). The ECS information can be used instead of the DNAI, such that the MNO is not required to disclose its network topology, e.g., the (IP) locations identified by the DNAI(s). In some embodiments, DNAI value(s) can be provided for application programming interface (API) backward compatibility; however, these DNAI value can be any known and/or predetermined value that indicates a valid ECS is being provided and should be used instead of the actual DNAI value(s).

Based on this information, an AF can select a new AS. As an example, the AF could itself issue a DNS Query including this ECS to resolve the AS selection. The AF can identify the selected AS in the acknowledgement of the UP path change notification sent to the SMF, and the SMF can use the identified AS to set traffic filters and steering rules in the ULCL/BP to the Local PSA. These notifications accelerate the reselection of an EAS at Edge re-allocation due to UP path change. Applicable UP path change scenarios include:

For PDU sessions with distributed anchor (e.g., as defined for SSC3) for applications whose clients do not support OS notification of new IP connectivity; and For PDU sessions with session breakout where previous and new local PSAs are both available, and communication to AS is not lost.

These scenarios have in common that previous and new PSA coexist for some time, with coexistence intended to facilitate service continuity during AS change.

Figure 6:
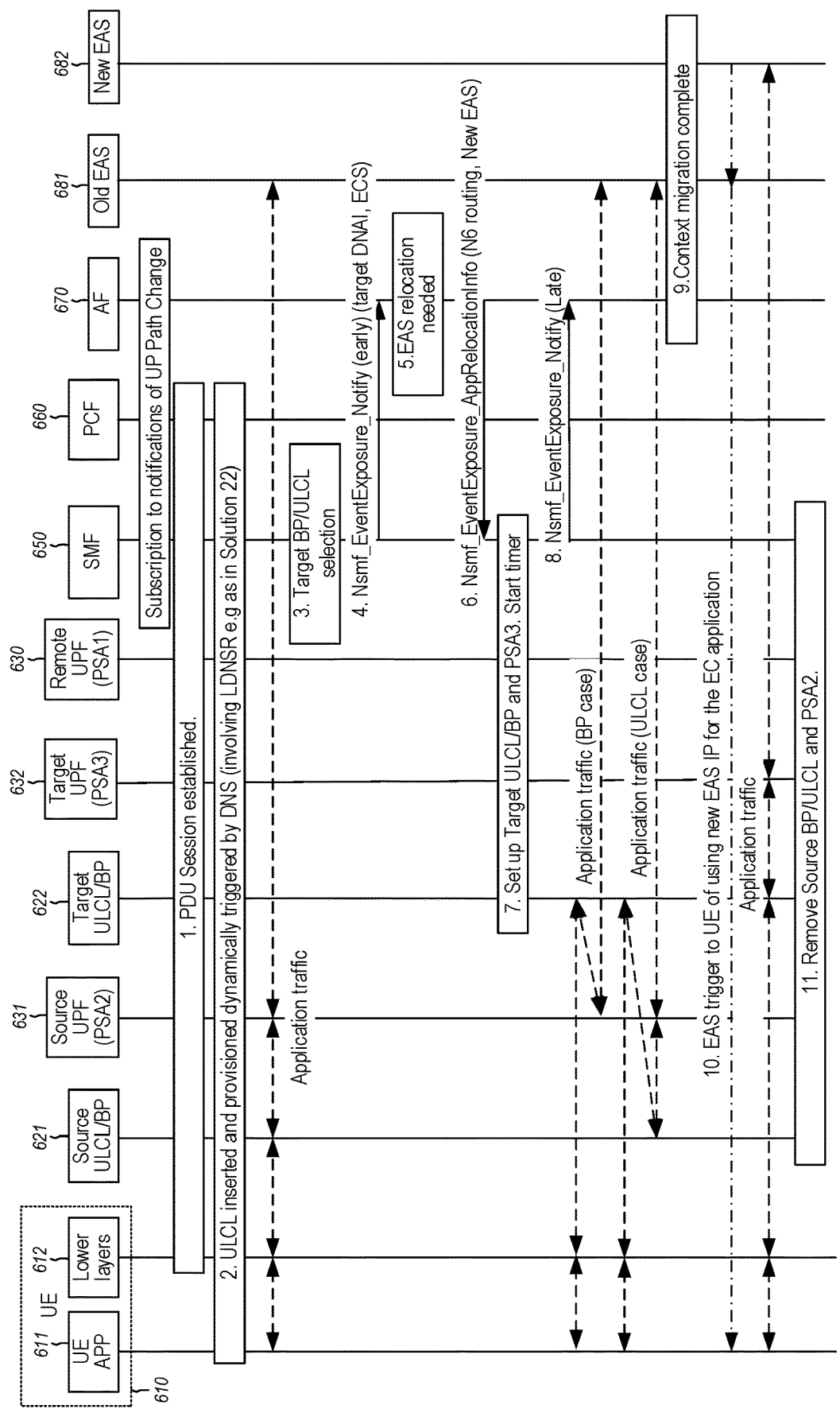
FIG. 6 is a signaling diagram for an exemplary procedure for a session breakout scenario where the ULCL/BP and local PSA insertion are triggered by DNS query, according to various exemplary embodiments of the present disclosure.
Figure 7:
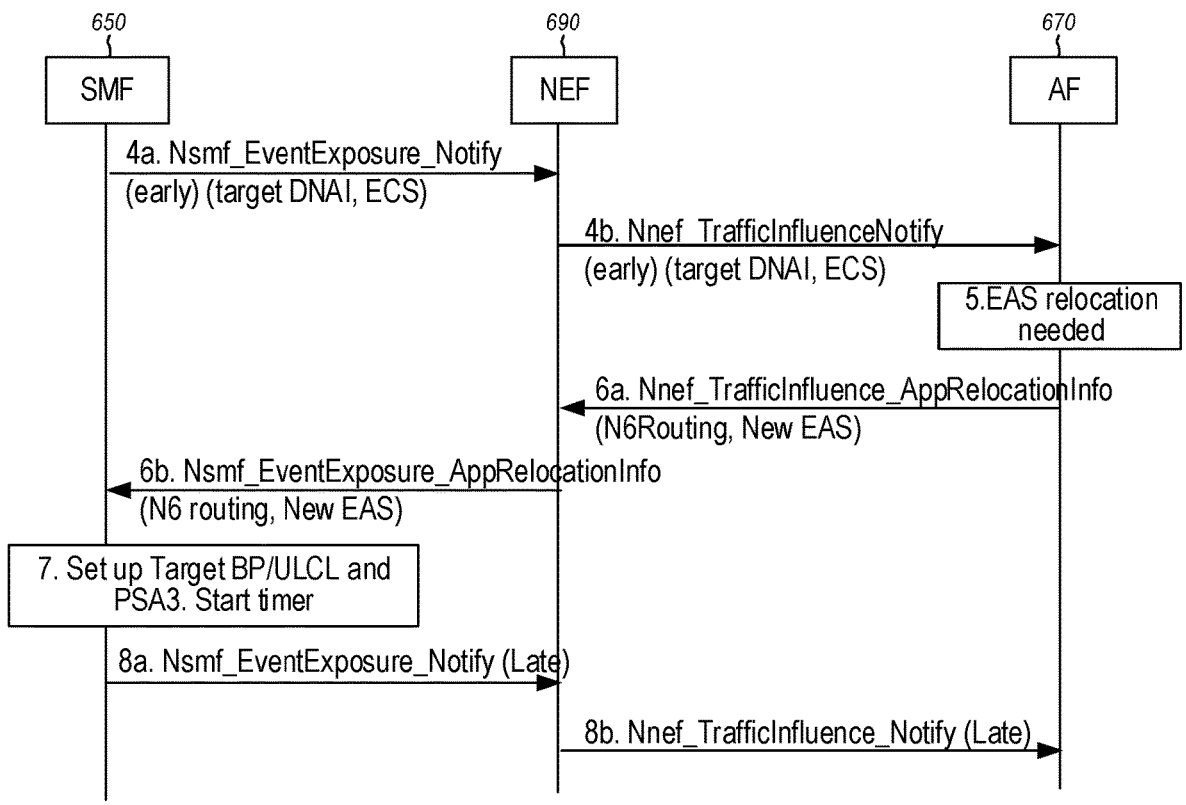
FIG. 7 illustrates an alternative to the exemplary procedure shown in FIG. 6, in which SMF-AF communication is indirect via NEF.

FIG. 6 is a signaling diagram for an exemplary procedure for a session breakout scenario where the ULCL/BP and local PSA insertion are triggered by DNS query, according to various exemplary embodiments of the present disclosure. The procedure of FIG. 6 involves a UE 610, a Source ULCL/BP 621, a Target ULCL/BP 622, a Remote UPF 630, a Source UPF 631, a Target UPF 632, an SMF 650, a PCF 660, an AF 670, an old EAS 681, and a new EAS 682. These elements may be arranged in an architecture as illustrated in FIG. 5. The UE 610 includes an application client (UE APP) 611 and lower layers 612 for handling communication with the network. The procedure shown in FIG. 6 assumes that direct communication is possible between SMF 650 and AF 670. FIG. 7, described below, illustrates an alternative in which SMF-AF communication is indirect via NEF 690. Although the operations shown in FIGS. 6-7 are given numerical labels, these are meant to facilitate explanation and do not imply any strict temporal order of the operations, unless specifically noted otherwise.

An SLA between the MNO and the Edge Service Provider (ESP) is a prerequisite to the procedure shown in FIG. 6. For the agreed applications, the ESP provides the MNO with EAS steering profiles or sets of AS IP ranges, e.g., the IPs of the ASs that are managed "together" for the service/FQDN, typically ASs deployed for the application on the same Edge Data Center (EDC). With this redundancy, application layer signalling could instruct the application client to send the traffic to an alternative AS due to load balancing, failure, etc.

Initially, as shown in FIG. 6, the AF 670 subscribes to notifications of UP Path change, Subscription can occur any time before operation 3. 3GPP TS 23.502 sections 4.3.6.2 and 4.6.3.4 specify applicable subscription procedures for session(s) or individual IP addresses. For example, subscription could be triggered by start of traffic for the user application.

In some embodiments, the API for AF influence on traffic routing could also be used by the ESP as a real time interface to provide the IPs mentioned above. A DNAI can be associated with each set of AS IP ranges, e.g., the IPs of the ASs that are managed "together" for the service/FQDN, as discussed above. However, the provided DNAIs do not need to identify the network accesses to the DN but rather can identify that an ECS is provided instead.

In FIG. 6 operation 1, a PDU Session is established with Remote UPF 630, which corresponds to a central anchor UPF (PSA1). In operation 2, dynamic BP/ULCL and local PSA insertion is triggered by a UE DNS query for application FQDN resolution. The SMF 650 manages and manipulates the DNS query according to a selected local PSA2 and provisions the traffic filters for the BP/ULCL considering the EAS in the DNS response (e.g., as in 3GPP TR 23.748 solution 22). Traffic flows towards the Old EAS 681 through the Source ULCL/BP and Source UPF (PSA2).

In operation 3, the SMF 650 determines that relocation of Source UL CL/BP 631 and Source UPF 631 (PSA2) is needed. The relocation may be triggered by UE mobility. SMF 650 selects the candidate Target UPF 632 (PSA3). In operation 4, based on the AF subscription, the SMF 650 sends an early notification to the AF 670 that includes an ECS to assist AS selection. In some embodiments, for the SMF 650 can also include a known and/or predetermined target DNAI value that indicates an ECS is provided and should be used. The SMF 650 can determine and/or calculate an ECS (e.g., as described in RFC 7871) that corresponds to the selected target UPF 632 (PSA3) and includes the ECS with the target DNAI in the notification. This ECS can represent the N6 interface of the target UPF (PSA3), e.g., it can be similar to ECS in DNS queries of EC domains. The SMF 650 does not proceed until it receives a positive response (e.g., acknowledgement) from the AF 670, as described in 3GPP TS 23.501 section 5.6.7.

In operation 5, the AF 670 determines based on information received in operation 4 that EAS relocation is needed. The ECS received in operation 4 can be used to select a new EAS 682 that is closest in IP distance to the new PSA (i.e., UPF 632 (PSA3)). For example, to determine a new EAS 682 that is closest to the new PSA, the AF 670 could send a DNS query that includes an identifier of the ECS received in the notification.

In operation 6, the AF 670 performs a Nsmf_EventExposure_AppRelocationInfo service operation towards the SMF 650, as described in 3GPP TS 23.501 section 4.3.6.3. In this operation (e.g., message), the AF 670 acknowledges the notification by returning the target DNAI (e.g., received in operation 4) and optionally includes N6 traffic routing information associated with the target DNAI. If the ECS with an IP subnet was received, the AF 670 also provides the IP address of the selected AS. At this stage the new UP path is not yet established and any further action (e.g., AS context migration) may be delayed until late notification that the PDU session change has been completed successfully.

In operation 7, the SMF 650 initiates change of UL CL/BP and local PSA. The SMF 670 determines (e.g., based on local configuration) that the Target UPF 632 (PSA3) and the Source UPF 631 (PSA2) need to coexist for some duration, as described further in 3GPP TS 23.503 (V15.5.0) section 4.3.5.7. A temporary N9 forwarding tunnel is established between the Source ULCL/BP 621 and Target ULCL/BP 622, as described further in 3GPP TS 23.501 section 5.6.4.2. One or more timers are initiated for the Source ULCL/BP 621 and Source UPF 631 (PSA2). For example, the SMF 650 could set inactivity timers for the traffic through the Source BP/ULCL 621 and Source UPF 631 (PSA2) to remove them after a period of inactivity.

In addition, traffic filters in Target UL CL/BP are provisioned to support session continuity during EAS relocation. For example, traffic to Old EAS 681 is steered through the Source UL CL/BP 621 and Source UPF 631 (PSA2) and traffic to the New EAS 682 is steered through the Target UL CL/BP 622 and Target UPF 632 (PSA3). The EAS identifier received in operation 6 is used to determine the traffic filters for the traffic steering to the new UPF, i.e. Target UPF 632 (PS3). The information provisioned as a prerequisite can also be considered, since this AS and other ASs may be application traffic destinations during the service session.

In operation 8, after Target BP/ULCL 622 and Target UPF 632 (PSA3) have been activated (as further described in 3GPP TS 23.502), the SMF 650 sends an event exposure (late notification) about the new UP path to the AF 670. The UE traffic continues to reach the old EAS 681 through the Source UL CL/BP 621 and Source UPF 631 (PSA2). This is useful while EAS relocation is being completed and allows the application client to switch to the new EAS 681 at a convenient time, e.g., in coordination with the two EAS 681, 682.

In operation 9, context migration between old EAS 681 and new EAS 682 is completed. In operation 10, the application client is instructed when and how to switch to the new EAS 682, using application layer procedures. In operation 11, the SMF 650 removes the Source ULCL/BP 621 and Source UPF 631 (PSA2) after the timer started in operation 7 expires.

In some embodiments, direct communication between the SMF 650 and the AF 670 shown in FIG. 6 is not possible. In such embodiments, notifications (including subscriptions and acknowledgements) are handled via the NEF 690. FIG. 7 is a signaling diagram that shows operations of FIG. 6 that are affected by indirect SMF-AF communication via NEF 690. Put differently, the operations shown in FIG. 7 are substitutes for like-numbered operations shown in FIG. 6. Other operations shown in FIG. 6 are not affected by the indirect SMF-AF communication.

In operation 4a, based on an existing NEF subscription, the SMF 650 sends an early notification to the NEF 690 that includes an ECS to assist AS selection. In some embodiments, for the SMF 650 can also include a known and/or predetermined target DNAI value that indicates an ECS is provided and should be used. The SMF 650 can determine these values in the manner described above in relation to FIG. 6. In operation 4b, the NEF 690 forwards the early notification to the AF 670, e.g., via a Nnef TrafficInfluence_Notify operation. The SMF 650 does not proceed until it receives a positive response (e.g., acknowledgement) from the NEF 690, as described in 3GPP TS 23.501 section 5.6.7.

Operation 5 is substantially identical to FIG. 6 operation 5 discussed above. In operation 6a, the AF 670 performs a Nnef_TrafficInfluence_AppRelocationInfo service operation towards the NEF 690, as described in 3GPP TS 23.501 section 4.3.6.3. In this operation (e.g., message), the AF 670 acknowledges the notification by returning the target DNAI (e.g., received in operation 4b) and optionally includes N6 traffic routing information associated with the target DNAI. If the ECS with an IP subnet was received, the AF 670 also provides the IP address of the selected AS. At this stage the new UP path is not yet established and any further action (e.g., AS context migration) may be delayed until late notification that the PDU session change has been completed successfully. In operation 6b, the NEF 690 forwards the information received in operation 6a to the SMF 650 via an Nsmf_EventExposure_AppRelocationInfo service operation.

Operation 7 is substantially identical to FIG. 6 operation 7 discussed above. In operation 8a, after Target BP/ULCL 622 and Target UPF 632 (PSA3) have been activated (as further described in 3GPP TS 23.502), the SMF 650 sends an event exposure (late notification) about the new UP path to the NEF 690. The UE traffic continues to reach the old EAS 681 through the Source UL CL/BP 621 and Source UPF 631 (PSA2). This is useful while EAS relocation is being completed and allows the application client to switch to the new EAS 682 at a convenient time, e.g., in coordination with the two EAS 681, 682. In operation 8b, the NEF 690 conveys the notification received in operation 8a to the AF 670 via a Nnef TrafficInfluence_Notify (Late) service operation.

Figure 8:
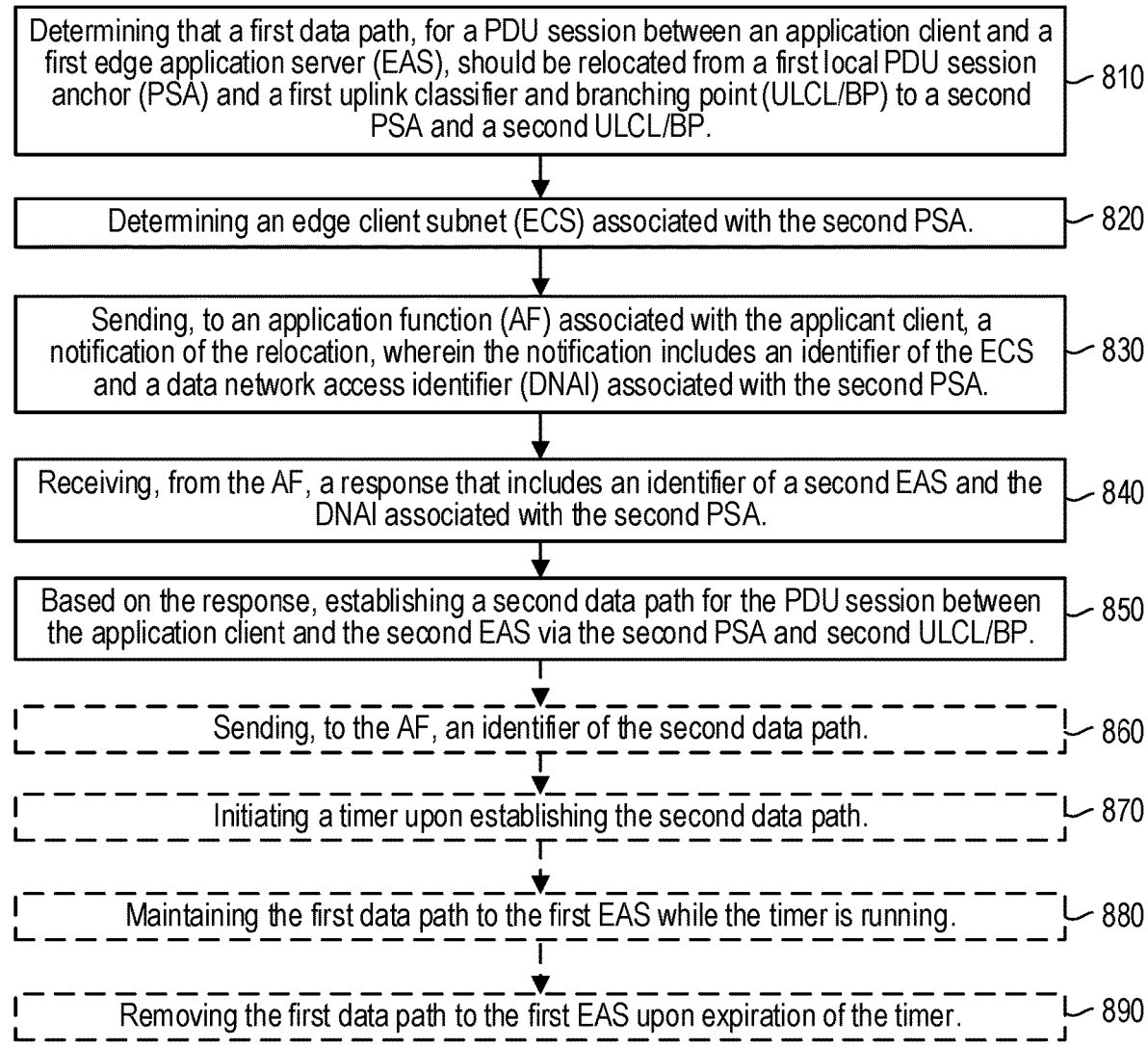
FIG. 8 shows an exemplary method (e.g., procedure) for a session management function (SMF) in a communication network, according to various exemplary embodiments of the present disclosure.
Figure 9:
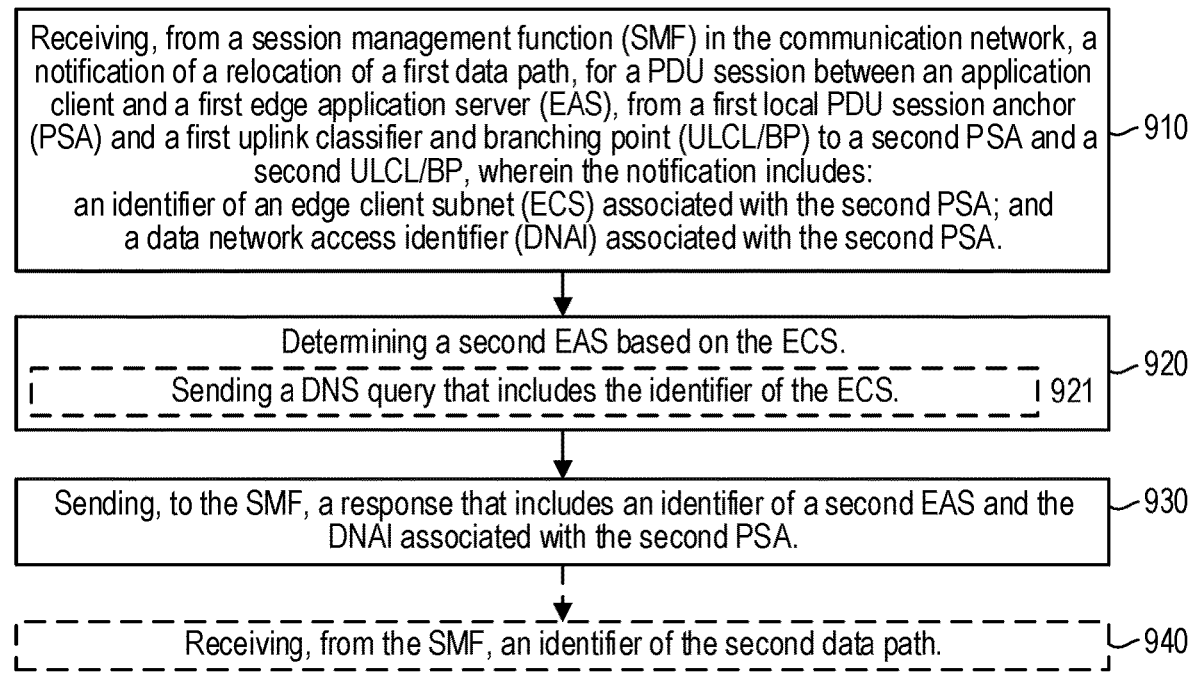
FIG. 9 shows an exemplary method (e.g., procedure) for an application function (AF) in a communication network, according to various exemplary embodiments of the present disclosure.

The embodiments described above (e.g., with reference to FIGS. 6-7) can be further illustrated with reference to FIGS. 8-9, which depict exemplary methods (e.g., procedures) performed by an SMF 650 and an AF 670, respectively. Put differently, various features of the operations described below correspond to various embodiments described above. The exemplary methods shown in FIGS. 8-9 can be complementary to each other such that they can be used cooperatively to provide benefits, advantages, and/or solutions to problems described herein. Although the exemplary methods are illustrated in FIGS. 8-9 by specific blocks in particular orders, the operations corresponding to the blocks can be performed in different orders than shown and can be combined and/or divided into operations having different functionality than shown. Optional blocks and/or operations are indicated by dashed lines.

More specifically, FIG. 8 illustrates an exemplary method (e.g., procedure) for a session management function (SMF) of a communication network (e.g., 5GC), according to various exemplary embodiments of the present disclosure. The exemplary method shown in FIG. 8 can be performed by SMFs described herein with reference to other figures, e.g., the SMF 650.

The exemplary method can include the operations of block 810, where the SMF can determine that a first data path, for a PDU session between an application client and a first edge application server (EAS), should be relocated from a first local PDU session anchor (PSA) and a first uplink classifier and branching point (ULCL/BP) to a second PSA and a second ULCL/BP. The exemplary method can also include the operations of block 820, where the SMF can determine an edge client subnet (ECS) associated with the second PSA. The exemplary method can also include the operations of block 830, where the SMF can send a notification of the relocation to an application function (AF) associated with the applicant client. The notification can include an identifier of the ECS and a data network access identifier (DNAI) associated with the second PSA. The exemplary method can also include the operations of block 840, where the SMF can receive, from the AF, a response that includes an identifier of a second EAS and the DNAI associated with the second PSA. The exemplary method can also include the operations of block 850, where the SMF can, based on the response, establish a second data path for the PDU session between the application client and the second EAS via the second PSA and the second ULCL/BP.

In some embodiments, the exemplary method can also include the operations of block 860, where the SMF can send, to the AF, an identifier of the second data path. These operations can correspond to operation 8 in FIGS. 6-7. In some embodiments, the exemplary method can also include the operations of blocks 870-890, where the SMF can initiate a timer upon establishing the second data path, maintain the first data path to the first EAS while the timer is running, and remove the first data path to the first EAS upon expiration of the timer. These operations can correspond to operations 7 and 11 in FIGS. 6-7.

In some embodiments, the DNAI (e.g., sent in block 830) can have a value that indicates that the ECS is included in the notification and should be used by the AF to select the second EAS. In some embodiments, determining that the first data path should be relocated (e.g., in block 810) can be based on a domain name service (DNS) query by the application client. In some embodiments, the first and second EAS can be associated with respective first and second ranges of IP addresses, associated with an application server, that are managed together.

In some embodiments, such as when direct SMF-AF communication is not possible, the notification can be sent to the AF (e.g., in block 830) via a network exposure function (NEF) in the communication network, and the response can be received from the AF (e.g., in block 840) via the NEF.

In addition, FIG. 9 illustrates an exemplary method (e.g., procedure) for an application function (AF) in a communication network (e.g., 5GC), according to various exemplary embodiments of the present disclosure. The exemplary method shown in FIG. 9 can be performed by an AF as shown and/or described in relation to other figures herein, e.g., the AF 670.

The exemplary method can include the operations of block 910, where the AF can receive, from a session management function (SMF) in the communication network, a notification of a relocation of a first data path, for a PDU session between an application client and a first edge application server (EAS), from a first local PDU session anchor (PSA) and a first uplink classifier and branching point (ULCL/BP) to a second PSA and a second ULCL/BP. The notification can include an identifier of an edge client subnet (ECS) associated with the second PSA and a data network access identifier (DNAI) associated with the second PSA. The exemplary method can also include the operations of block 920, where the AF can determine a second EAS based on the ECS. The exemplary method can also include the operation of block 930, where the AF can send, to the SMF, a response that includes an identifier of a second EAS and the DNAI associated with the second PSA.

In some embodiments, the exemplary method can also include the operations of block 940, where the AF can receive, from the SMF, an identifier of the second data path. These operations can correspond to operation 8 in FIGS. 6-7.

In some embodiments, the DNAI (e.g., received in block 910) can have a value that indicates that the ECS is included in the notification and should be used by the AF to select the second EAS. In some embodiments, determining the second EAS in block 920 can include the operations of sub-block 921, where the AF can send a domain name service (DNS) query that includes the identifier of the ECS. In such embodiments, the identifier of the second EAS (e.g., sent in block 930) can include an IP address of the second EAS received in response to the DNS query.

In some embodiments, the first and second EAS can be associated with respective first and second ranges of IP addresses, associated with an application server, that are managed together. In some embodiments, such as when direct SMF-AF communication is not possible, the notification can be received from the SMF (e.g., in block 910) via a network exposure function (NEF) in the communication network, and the response can be sent to the SMF (e.g., in block 930) via the NEF.

Figure 10:
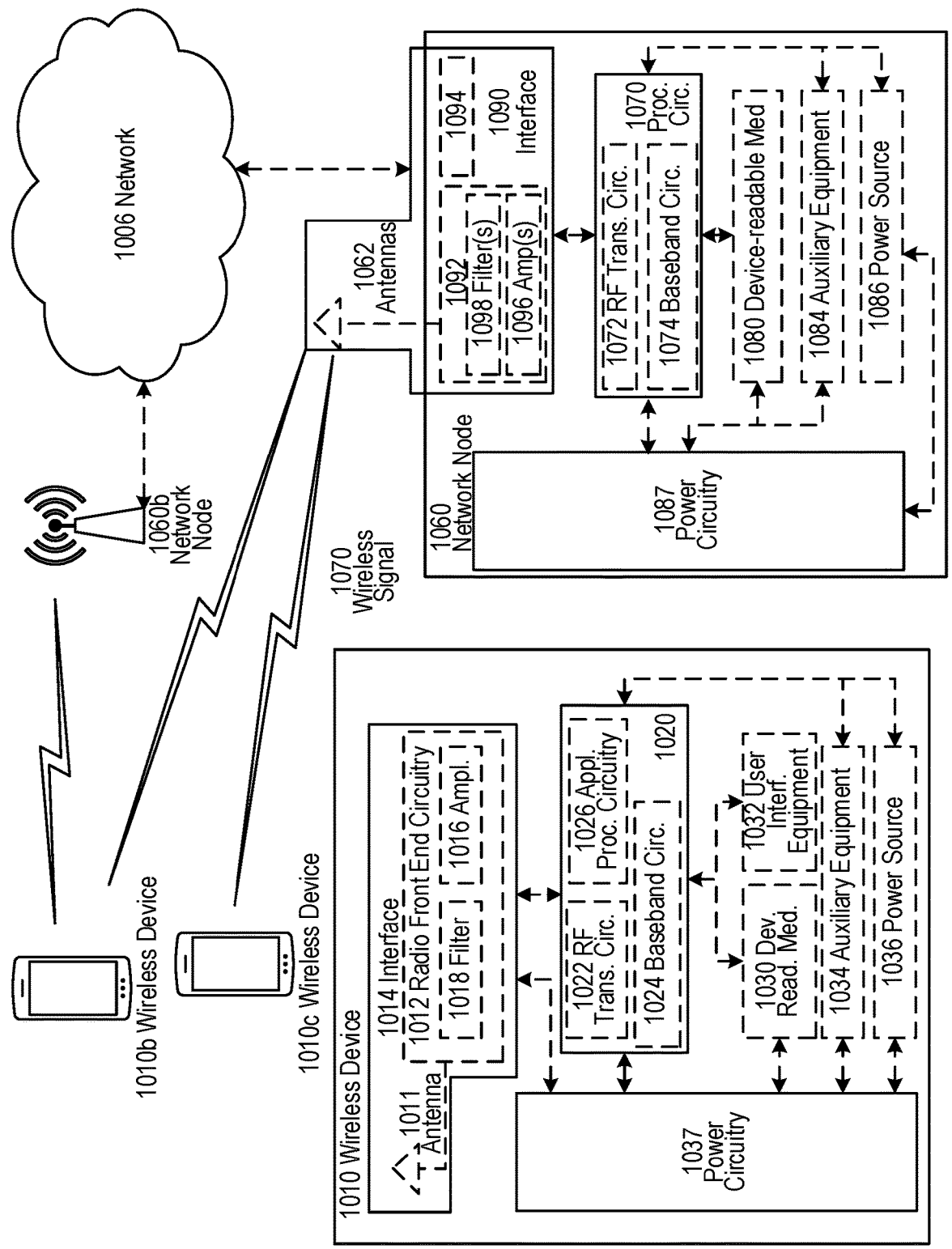
FIG. 10 illustrates a wireless network, according to various exemplary embodiments of the present disclosure.

Although the subject matter described herein can be implemented in any appropriate type of system using any suitable components, the embodiments disclosed herein are described in relation to a wireless network, such as the example wireless network illustrated in FIG. 10. For simplicity, the wireless network of FIG. 10 only depicts network 1006, network nodes 1060 and 1060b, and WDs 1010, 1010b, and 1010c. In practice, a wireless network can further include any additional elements suitable to support communication between wireless devices or between a wireless device and another communication device, such as a landline telephone, a service provider, or any other network node or end device. Of the illustrated components, network node 1060 and wireless device (WD) 1010 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1006 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1060 and WD 1010 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs, SMFs, AFs, NEFs), O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network. In the context of the present disclosure, network node 1060 may for example correspond to or implement the above-mentioned SMF 650 or AF 670.

In FIG. 10, network node 1060 includes processing circuitry 1070, device readable medium 1080, interface 1090, auxiliary equipment 1084, power source 1086, power circuitry 1087, and antenna 1062. Although network node 1060 illustrated in the example wireless network of FIG. 10 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 1060 are depicted as single boxes located within a larger box, or nested within multiple boxes, in practice, a network node can comprise multiple different physical components that make up a single illustrated component (e.g., device readable medium 1080 can comprise multiple separate hard drives as well as multiple RAM modules).

Similarly, network node 1060 can be composed of multiple physically separate components (e.g., a NodeB component and an RNC component, or a BTS component and a BSC component, etc.), which can each have their own respective components. In certain scenarios in which network node 1060 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 1060 can be configured to support multiple radio access technologies (RATs). In such embodiments, some components can be duplicated (e.g., separate device readable medium 1080 for the different RATs) and some components can be reused (e.g., the same antenna 1062 can be shared by the RATs). Network node 1060 can also include multiple sets of the various illustrated components for different wireless technologies integrated into network node 1060, such as, for example, GSM, WCDMA, LTE, NR, WiFi, or Bluetooth wireless technologies. These wireless technologies can be integrated into the same or different chip or set of chips and other components within network node 1060.

Processing circuitry 1070 can be configured to perform any determining, calculating, or similar operations (e.g., certain obtaining operations) described herein as being provided by a network node. These operations performed by processing circuitry 1070 can include processing information obtained by processing circuitry 1070 by, for example, converting the obtained information into other information, comparing the obtained information or converted information to information stored in the network node, and/or performing one or more operations based on the obtained information or converted information, and as a result of said processing making a determination.

Processing circuitry 1070 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide various functionality of network node 1060, either alone or in conjunction with other network node 1060 components (e.g., device readable medium 1080). Such functionality can include any of the various wireless features, functions, or benefits discussed herein.

For example, processing circuitry 1070 can execute instructions stored in device readable medium 1080 or in memory within processing circuitry 1070. In some embodiments, processing circuitry 1070 can include a system on a chip (SOC). As a more specific example, instructions (also referred to as a computer program product) stored in medium 1080 can include instructions that, when executed by processing circuitry 1070, can configure network node 1060 to perform operations corresponding to various exemplary methods (e.g., procedures) described herein.

In some embodiments, processing circuitry 1070 can include one or more of radio frequency (RF) transceiver circuitry 1072 and baseband processing circuitry 1074. In some embodiments, radio frequency (RF) transceiver circuitry 1072 and baseband processing circuitry 1074 can be on separate chips (or sets of chips), boards, or units, such as radio units and digital units. In alternative embodiments, part or all of RF transceiver circuitry 1072 and baseband processing circuitry 1074 can be on the same chip or set of chips, boards, or units.

In certain embodiments, some or all of the functionality described herein as being provided by a network node, base station, eNB or other such network device can be performed by processing circuitry 1070 executing instructions stored on device readable medium 1080 or memory within processing circuitry 1070. In alternative embodiments, some or all of the functionality can be provided by processing circuitry 1070 without executing instructions stored on a separate or discrete device readable medium, such as in a hard-wired manner. In any of those embodiments, whether executing instructions stored on a device readable storage medium or not, processing circuitry 1070 can be configured to perform the described functionality. The benefits provided by such functionality are not limited to processing circuitry 1070 alone or to other components of network node 1060 but are enjoyed by network node 1060 as a whole, and/or by end users and the wireless network generally.

Device readable medium 1080 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 1070. Device readable medium 1080 can store any suitable instructions, data or information, including a computer program, software, an application including one or more of logic, rules, code, tables, etc. and/or other instructions capable of being executed by processing circuitry 1070 and, utilized by network node 1060. Device readable medium 1080 can be used to store any calculations made by processing circuitry 1070 and/or any data received via interface 1090. In some embodiments, processing circuitry 1070 and device readable medium 1080 can be considered to be integrated.

Interface 1090 is used in the wired or wireless communication of signaling and/or data between network node 1060, network 1006, and/or WDs 1010. As illustrated, interface 1090 comprises port(s)/terminal(s) 1094 to send and receive data, for example to and from network 1006 over a wired connection. Interface 1090 also includes radio front end circuitry 1092 that can be coupled to, or in certain embodiments a part of, antenna 1062. Radio front end circuitry 1092 comprises filters 1098 and amplifiers 1096. Radio front end circuitry 1092 can be connected to antenna 1062 and processing circuitry 1070. Radio front end circuitry can be configured to condition signals communicated between antenna 1062 and processing circuitry 1070. Radio front end circuitry 1092 can receive digital data that is to be sent out to other network nodes or WDs via a wireless connection. Radio front end circuitry 1092 can convert the digital data into a radio signal having the appropriate channel and bandwidth parameters using a combination of filters 1098 and/or amplifiers 1096. The radio signal can then be transmitted via antenna 1062. Similarly, when receiving data, antenna 1062 can collect radio signals which are then converted into digital data by radio front end circuitry 1092. The digital data can be passed to processing circuitry 1070. In other embodiments, the interface can comprise different components and/or different combinations of components.

In certain alternative embodiments, network node 1060 may not include separate radio front end circuitry 1092, instead, processing circuitry 1070 can comprise radio front end circuitry and can be connected to antenna 1062 without separate radio front end circuitry 1092. Similarly, in some embodiments, all or some of RF transceiver circuitry 1072 can be considered a part of interface 1090. In still other embodiments, interface 1090 can include one or more ports or terminals 1094, radio front end circuitry 1092, and RF transceiver circuitry 1072, as part of a radio unit (not shown), and interface 1090 can communicate with baseband processing circuitry 1074, which is part of a digital unit (not shown).

Antenna 1062 can include one or more antennas, or antenna arrays, configured to send and/or receive wireless signals. Antenna 1062 can be coupled to radio front end circuitry 1090 and can be any type of antenna capable of transmitting and receiving data and/or signals wirelessly. In some embodiments, antenna 1062 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 1062 can be separate from network node 1060 and can be connectable to network node 1060 through an interface or port.

Antenna 1062, interface 1090, and/or processing circuitry 1070 can be configured to perform any receiving operations and/or certain obtaining operations described herein as being performed by a network node. Any information, data and/or signals can be received from a wireless device, another network node and/or any other network equipment. Similarly, antenna 1062, interface 1090, and/or processing circuitry 1070 can be configured to perform any transmitting operations described herein as being performed by a network node. Any information, data and/or signals can be transmitted to a wireless device, another network node and/or any other network equipment.

Power circuitry 1087 can comprise, or be coupled to, power management circuitry and can be configured to supply the components of network node 1060 with power for performing the functionality described herein. Power circuitry 1087 can receive power from power source 1086. Power source 1086 and/or power circuitry 1087 can be configured to provide power to the various components of network node 1060 in a form suitable for the respective components (e.g., at a voltage and current level needed for each respective component). Power source 1086 can either be included in, or external to, power circuitry 1087 and/or network node 1060. For example, network node 1060 can be connectable to an external power source (e.g., an electricity outlet) via an input circuitry or interface such as an electrical cable, whereby the external power source supplies power to power circuitry 1087. As a further example, power source 1086 can comprise a source of power in the form of a battery or battery pack which is connected to, or integrated in, power circuitry 1087. The battery can provide backup power should the external power source fail. Other types of power sources, such as photovoltaic devices, can also be used.

Alternative embodiments of network node 1060 can include additional components beyond those shown in FIG. 10 that can be responsible for providing certain aspects of the network node's functionality, including any of the functionality described herein and/or any functionality necessary to support the subject matter described herein. For example, network node 1060 can include user interface equipment to allow and/or facilitate input of information into network node 1060 and to allow and/or facilitate output of information from network node 1060. This can allow and/or facilitate a user to perform diagnostic, maintenance, repair, and other administrative functions for network node 1060.

In some embodiments, a wireless device (WD, e.g., WD 1010) can be configured to transmit and/or receive information without direct human interaction. For instance, a WD can be designed to transmit information to a network on a predetermined schedule, when triggered by an internal or external event, or in response to requests from the network. Examples of a WD include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 1010 includes antenna 1011, interface 1014, processing circuitry 1020, device readable medium 1030, user interface equipment 1032, auxiliary equipment 1034, power source 1036 and power circuitry 1037. WD 1010 can include multiple sets of one or more of the illustrated components for different wireless technologies supported by WD 1010, such as, for example, GSM, WCDMA, LTE, NR, WiFi, WiMAX, or Bluetooth wireless technologies, just to mention a few. These wireless technologies can be integrated into the same or different chips or set of chips as other components within WD 1010.

Antenna 1011 can include one or more antennas or antenna arrays, configured to send and/or receive wireless signals, and is connected to interface 1014. In certain alternative embodiments, antenna 1011 can be separate from WD 1010 and be connectable to WD 1010 through an interface or port. Antenna 1011, interface 1014, and/or processing circuitry 1020 can be configured to perform any receiving or transmitting operations described herein as being performed by a WD. Any information, data and/or signals can be received from a network node and/or another WD. In some embodiments, radio front end circuitry and/or antenna 1011 can be considered an interface.

As illustrated, interface 1014 comprises radio front end circuitry 1012 and antenna 1011. Radio front end circuitry 1012 comprise one or more filters 1018 and amplifiers 1016. Radio front end circuitry 1014 is connected to antenna 1011 and processing circuitry 1020 and can be configured to condition signals communicated between antenna 1011 and processing circuitry 1020. Radio front end circuitry 1012 can be coupled to or a part of antenna 1011. In some embodiments, WD 1010 may not include separate radio front end circuitry 1012; rather, processing circuitry 1020 can comprise radio front end circuitry and can be connected to antenna 1011. Similarly, in some embodiments, some or all of RF transceiver circuitry 1022 can be considered a part of interface 1014. Radio front end circuitry 1012 can receive digital data that is to be sent out to other network nodes or WDs via a wireless connection. Radio front end circuitry 1012 can convert the digital data into a radio signal having the appropriate channel and bandwidth parameters using a combination of filters 1018 and/or amplifiers 1016. The radio signal can then be transmitted via antenna 1011. Similarly, when receiving data, antenna 1011 can collect radio signals which are then converted into digital data by radio front end circuitry 1012. The digital data can be passed to processing circuitry 1020. In other embodiments, the interface can comprise different components and/or different combinations of components.

Processing circuitry 1020 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide WD 1010 functionality either alone or in combination with other WD 1010 components, such as device readable medium 1030. Such functionality can include any of the various wireless features or benefits discussed herein.

For example, processing circuitry 1020 can execute instructions stored in device readable medium 1030 or in memory within processing circuitry 1020 to provide the functionality disclosed herein. More specifically, instructions (also referred to as a computer program product) stored in medium 1030 can include instructions that, when executed by processor 1020, can configure wireless device 1010 to perform operations corresponding to various exemplary methods (e.g., procedures) described herein.

As illustrated, processing circuitry 1020 includes one or more of RF transceiver circuitry 1022, baseband processing circuitry 1024, and application processing circuitry 1026. In other embodiments, the processing circuitry can comprise different components and/or different combinations of components. In certain embodiments processing circuitry 1020 of WD 1010 can comprise a SOC. In some embodiments, RF transceiver circuitry 1022, baseband processing circuitry 1024, and application processing circuitry 1026 can be on separate chips or sets of chips. In alternative embodiments, part or all of baseband processing circuitry 1024 and application processing circuitry 1026 can be combined into one chip or set of chips, and RF transceiver circuitry 1022 can be on a separate chip or set of chips. In still alternative embodiments, part or all of RF transceiver circuitry 1022 and baseband processing circuitry 1024 can be on the same chip or set of chips, and application processing circuitry 1026 can be on a separate chip or set of chips. In yet other alternative embodiments, part or all of RF transceiver circuitry 1022, baseband processing circuitry 1024, and application processing circuitry 1026 can be combined in the same chip or set of chips. In some embodiments, RF transceiver circuitry 1022 can be a part of interface 1014. RF transceiver circuitry 1022 can condition RF signals for processing circuitry 1020.

In certain embodiments, some or all of the functionality described herein as being performed by a WD can be provided by processing circuitry 1020 executing instructions stored on device readable medium 1030, which in certain embodiments can be a computer-readable storage medium. In alternative embodiments, some or all of the functionality can be provided by processing circuitry 1020 without executing instructions stored on a separate or discrete device readable storage medium, such as in a hard-wired manner. In any of those particular embodiments, whether executing instructions stored on a device readable storage medium or not, processing circuitry 1020 can be configured to perform the described functionality. The benefits provided by such functionality are not limited to processing circuitry 1020 alone or to other components of WD 1010, but are enjoyed by WD 1010 as a whole, and/or by end users and the wireless network generally.

Processing circuitry 1020 can be configured to perform any determining, calculating, or similar operations (e.g., certain obtaining operations) described herein as being performed by a WD. These operations, as performed by processing circuitry 1020, can include processing information obtained by processing circuitry 1020 by, for example, converting the obtained information into other information, comparing the obtained information or converted information to information stored by WD 1010, and/or performing one or more operations based on the obtained information or converted information, and as a result of said processing making a determination.

Device readable medium 1030 can be operable to store a computer program, software, an application including one or more of logic, rules, code, tables, etc. and/or other instructions capable of being executed by processing circuitry 1020. Device readable medium 1030 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 1020. In some embodiments, processing circuitry 1020 and device readable medium 1030 can be considered to be integrated.

User interface equipment 1032 can include components that allow and/or facilitate a human user to interact with WD 1010. Such interaction can be of many forms, such as visual, audial, tactile, etc. User interface equipment 1032 can be operable to produce output to the user and to allow and/or facilitate the user to provide input to WD 1010. The type of interaction can vary depending on the type of user interface equipment 1032 installed in WD 1010. For example, if WD 1010 is a smart phone, the interaction can be via a touch screen; if WD 1010 is a smart meter, the interaction can be through a screen that provides usage (e.g., the number of gallons used) or a speaker that provides an audible alert (e.g., if smoke is detected). User interface equipment 1032 can include input interfaces, devices and circuits, and output interfaces, devices and circuits. User interface equipment 1032 can be configured to allow and/or facilitate input of information into WD 1010 and is connected to processing circuitry 1020 to allow and/or facilitate processing circuitry 1020 to process the input information. User interface equipment 1032 can include, for example, a microphone, a proximity or other sensor, keys/buttons, a touch display, one or more cameras, a USB port, or other input circuitry. User interface equipment 1032 is also configured to allow and/or facilitate output of information from WD 1010, and to allow and/or facilitate processing circuitry 1020 to output information from WD 1010. User interface equipment 1032 can include, for example, a speaker, a display, vibrating circuitry, a USB port, a headphone interface, or other output circuitry. Using one or more input and output interfaces, devices, and circuits, of user interface equipment 1032, WD 1010 can communicate with end users and/or the wireless network and allow and/or facilitate them to benefit from the functionality described herein.

Auxiliary equipment 1034 is operable to provide more specific functionality which may not be generally performed by WDs. This can comprise specialized sensors for doing measurements for various purposes, interfaces for additional types of communication such as wired communications etc. The inclusion and type of components of auxiliary equipment 1034 can vary depending on the embodiment and/or scenario.

Power source 1036 can, in some embodiments, be in the form of a battery or battery pack. Other types of power sources, such as an external power source (e.g., an electricity outlet), photovoltaic devices or power cells, can also be used. WD 1010 can further comprise power circuitry 1037 for delivering power from power source 1036 to the various parts of WD 1010 which need power from power source 1036 to carry out any functionality described or indicated herein. Power circuitry 1037 can in certain embodiments comprise power management circuitry. Power circuitry 1037 can additionally or alternatively be operable to receive power from an external power source; in which case WD 1010 can be connectable to the external power source (such as an electricity outlet) via input circuitry or an interface such as an electrical power cable. Power circuitry 1037 can also in certain embodiments be operable to deliver power from an external power source to power source 1036. This can be, for example, for the charging of power source 1036. Power circuitry 1037 can perform any converting or other modification to the power from power source 1036 to make it suitable for supply to the respective components of WD 1010.

Figure 11:
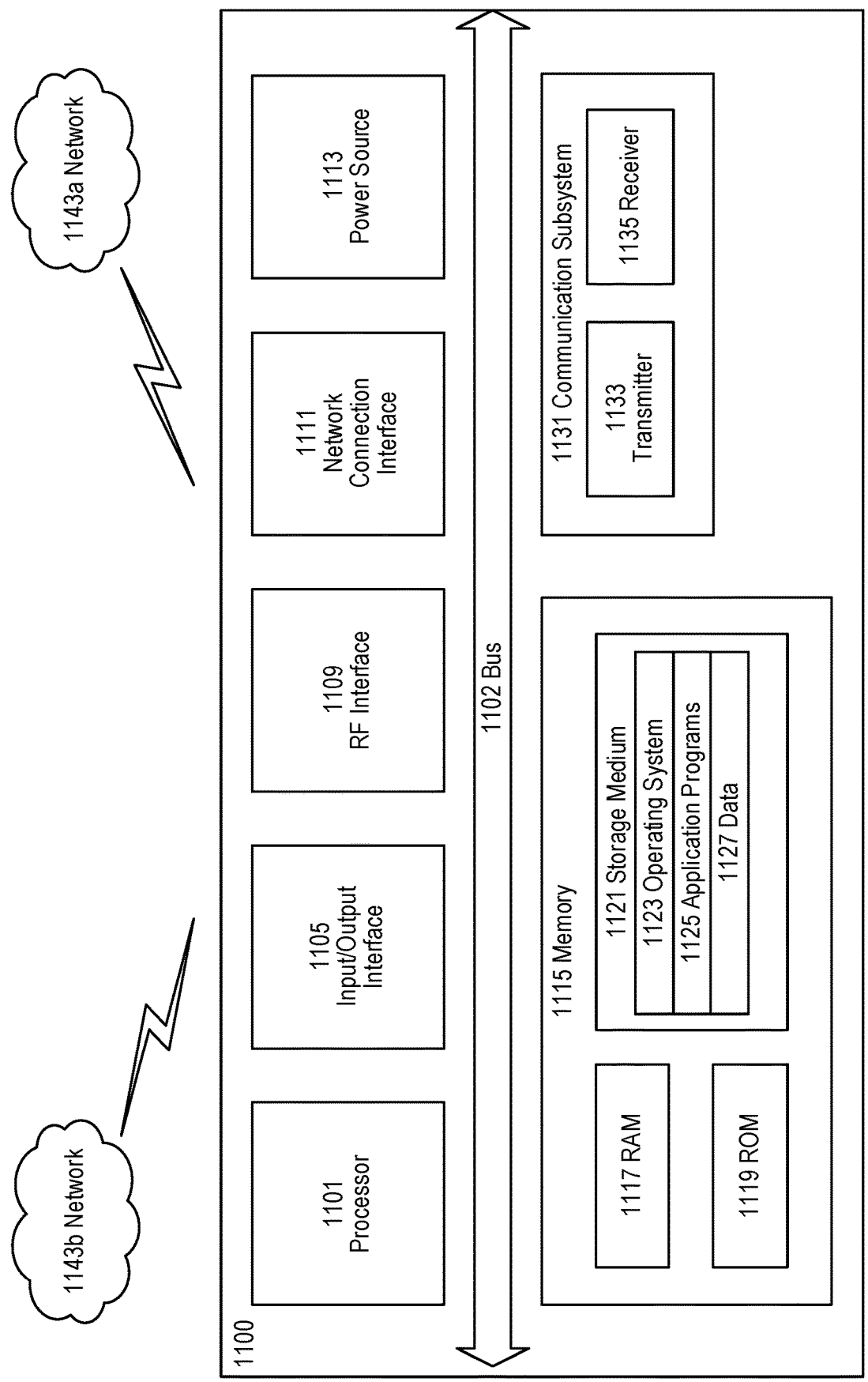
FIG. 11 shows an exemplary embodiment of a UE, in accordance with various aspects described herein.

FIG. 11 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 1100 can be any UE identified by the $3^{rd}$ Generation Partnership Project (3GPP), including a NB-IoT UE, a machine type communication (MTC) UE, and/or an enhanced MTC (eMTC) UE. UE 1100, as illustrated in FIG. 11, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE can be used interchangeable, although FIG. 11 is a UE, the components discussed herein are equally applicable to a WD, and vice-versa.

In FIG. 11, UE 1100 includes processing circuitry 1101 that is operatively coupled to input/output interface 1105, radio frequency (RF) interface 1109, network connection interface 1111, memory 1115 including random access memory (RAM) 1117, read-only memory (ROM) 1119, and storage medium 1121 or the like, communication subsystem 1131, power source 1133, and/or any other component, or any combination thereof. Storage medium 1121 includes operating system 1123, application program 1125, and data 1127. In other embodiments, storage medium 1121 can include other similar types of information. Certain UEs can utilize all of the components shown in FIG. 11, or only a subset of the components. The level of integration between the components can vary from one UE to another UE. Further, certain UEs can contain multiple instances of a component, such as multiple processors, memories, transceivers, transmitters, receivers, etc.

In FIG. 11, processing circuitry 1101 can be configured to process computer instructions and data. Processing circuitry 1101 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1101 can include two central processing units (CPUs). Data can be information in a form suitable for use by a computer.

In the depicted embodiment, input/output interface 1105 can be configured to provide a communication interface to an input device, output device, or input and output device. UE 1100 can be configured to use an output device via input/output interface 1105. An output device can use the same type of interface port as an input device. For example, a USB port can be used to provide input to and output from UE 1100. The output device can be a speaker, a sound card, a video card, a display, a monitor, a printer, an actuator, an emitter, a smartcard, another output device, or any combination thereof. UE 1100 can be configured to use an input device via input/output interface 1105 to allow and/or facilitate a user to capture information into UE 1100. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 11, RF interface 1109 can be configured to provide a communication interface to RF components such as a transmitter, a receiver, and an antenna. Network connection interface 1111 can be configured to provide a communication interface to network 1143*a*. Network 1143*a* can encompass wired and/or wireless networks such as a local-area network (LAN), a wide-area network (WAN), a computer network, a wireless network, a telecommunications network, another like network or any combination thereof. For example, network 1143*a* can comprise a Wi-Fi network. Network connection interface 1111 can be configured to include a receiver and a transmitter interface used to communicate with one or more other devices over a communication network according to one or more communication protocols, such as Ethernet, TCP/IP, SONET, ATM, or the like. Network connection interface 1111 can implement receiver and transmitter functionality appropriate to the communication network links (e.g., optical, electrical, and the like). The transmitter and receiver functions can share circuit components, software or firmware, or alternatively can be implemented separately.

RAM 1117 can be configured to interface via bus 1102 to processing circuitry 1101 to provide storage or caching of data or computer instructions during the execution of software programs such as the operating system, application programs, and device drivers. ROM 1119 can be configured to provide computer instructions or data to processing circuitry 1101. For example, ROM 1119 can be configured to store invariant low-level system code or data for basic system functions such as basic input and output (I/O), startup, or reception of keystrokes from a keyboard that are stored in a non-volatile memory. Storage medium 1121 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives.

In one example, storage medium 1121 can be configured to include operating system 1123; application program 1125 such as a web browser application, a widget or gadget engine or another application; and data file 1127. Storage medium 1121 can store, for use by UE 1100, any of a variety of various operating systems or combinations of operating systems. For example, application program 1125 can include executable program instructions (also referred to as a computer program product) that, when executed by processor 1101, can configure UE 1100 to perform operations corresponding to various exemplary methods (e.g., procedures) described herein.

Storage medium 1121 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1121 can allow and/or facilitate UE 1100 to access computer-executable instructions, application programs or the like, stored on transitory or non-transitory memory media, to off-load data, or to upload data. An article of manufacture, such as one utilizing a communication system can be tangibly embodied in storage medium 1121, which can comprise a device readable medium.

In FIG. 11, processing circuitry 1101 can be configured to communicate with network 1143b using communication subsystem 1131. Network 1143a and network 1143b can be the same network or networks or different network or networks. Communication subsystem 1131 can be configured to include one or more transceivers used to communicate with network 1143b. For example, communication subsystem 1131 can be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver can include transmitter 1133 and/or receiver 1135 to implement transmitter or receiver functionality, respectively, appropriate to the RAN links (e.g., frequency allocations and the like). Further, transmitter 1133 and receiver 1135 of each transceiver can share circuit components, software or firmware, or alternatively can be implemented separately.

In the illustrated embodiment, the communication functions of communication subsystem 1131 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1131 can include cellular communication, Wi-Fi communication, Bluetooth communication, and GPS communication. Network 1143b can encompass wired and/or wireless networks such as a local-area network (LAN), a wide-area network (WAN), a computer network, a wireless network, a telecommunications network, another like network or any combination thereof. For example, network 1143b can be a cellular network, a Wi-Fi network, and/or a near-field network. Power source 1113 can be configured to provide alternating current (AC) or direct current (DC) power to components of UE 1100.

The features, benefits and/or functions described herein can be implemented in one of the components of UE 1100 or partitioned across multiple components of UE 1100. Further, the features, benefits, and/or functions described herein can be implemented in any combination of hardware, software or firmware. In one example, communication subsystem 1131 can be configured to include any of the components described herein. Further, processing circuitry 1101 can be configured to communicate with any of such components over bus 1102. In another example, any of such components can be represented by program instructions stored in memory that when executed by processing circuitry 1101 perform the corresponding functions described herein. In another example, the functionality of any of such components can be partitioned between processing circuitry 1101 and communication subsystem 1131. In another example, the non-computationally intensive functions of any of such components can be implemented in software or firmware and the computationally intensive functions can be implemented in hardware.

Figure 12:
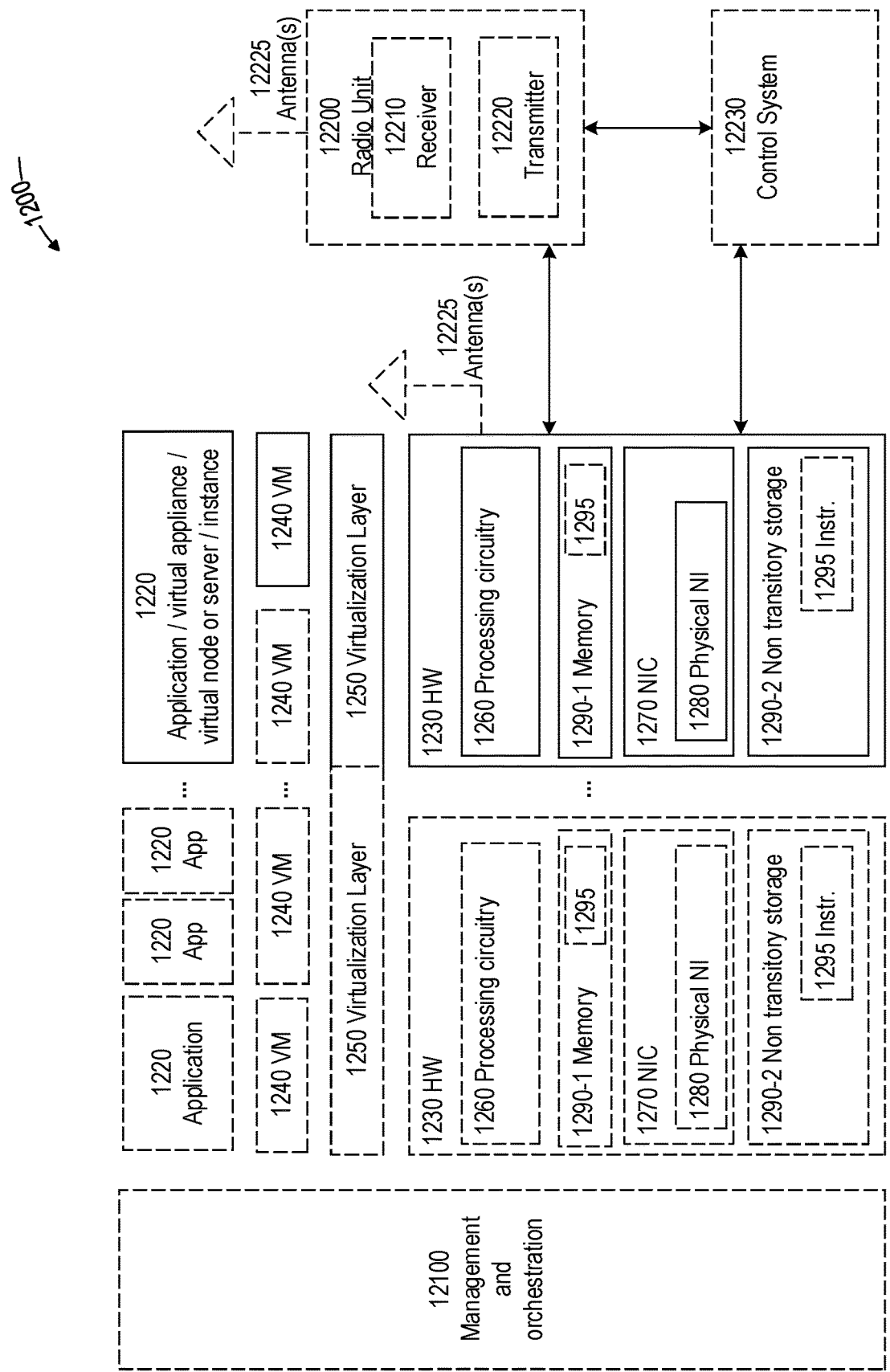
FIG. 12 is a block diagram illustrating an exemplary virtualization environment usable for implementation of various embodiments of network nodes or NFs described herein.

FIG. 12 is a schematic block diagram illustrating a virtualization environment 1200 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1200 hosted by one or more of hardware nodes 1230. Further, in embodiments in which the virtual node is not a radio access node or does not require radio connectivity (e.g., a core network node), then the network node can be entirely virtualized.

The functions can be implemented by one or more applications 1220 (which can alternatively be called software instances, virtual appliances, network functions, virtual nodes, virtual network functions, etc.) operative to implement some of the features, functions, and/or benefits of some of the embodiments disclosed herein. Applications 1220 are run in virtualization environment 1200 which provides hardware 1230 comprising processing circuitry 1260 and memory 1290. Memory 1290 contains instructions 1295 executable by processing circuitry 1260 whereby application 1220 is operative to provide one or more of the features, benefits, and/or functions disclosed herein.

Virtualization environment 1200 can include general-purpose or special-purpose network hardware devices (or nodes) 1230 comprising a set of one or more processors or processing circuitry 1260, which can be commercial off-the-shelf (COTS) processors, dedicated Application Specific Integrated Circuits (ASICs), or any other type of processing circuitry including digital or analog hardware components or special purpose processors. Each hardware device can comprise memory 1290-1 which can be non-persistent memory for temporarily storing instructions 1295 or software executed by processing circuitry 1260. For example, instructions 1295 can include program instructions (also referred to as a computer program product) that, when executed by processing circuitry 1260, can configure hardware node 1220 to perform operations corresponding to various exemplary methods (e.g., procedures) described herein. Such operations can also be attributed to virtual node(s) 1220 that is/are hosted by hardware node 1230.

Each hardware device can comprise one or more network interface controllers (NICs) 1270, also known as network interface cards, which include physical network interface 1280. Each hardware device can also include non-transitory, persistent, machine-readable storage media 1290-2 having stored therein software 1295 and/or instructions executable by processing circuitry 1260. Software 1295 can include any type of software including software for instantiating one or more virtualization layers 1250 (also referred to as hypervisors), software to execute virtual machines 1240 as well as software allowing it to execute functions, features and/or benefits described in relation with some embodiments described herein.

Virtual machines 1240, comprise virtual processing, virtual memory, virtual networking or interface and virtual storage, and can be run by a corresponding virtualization layer 1250 or hypervisor. Different embodiments of the instance of virtual appliance 1220 can be implemented on one or more of virtual machines 1240, and the implementations can be made in different ways.

During operation, processing circuitry 1260 executes software 1295 to instantiate the hypervisor or virtualization layer 1250, which can sometimes be referred to as a virtual machine monitor (VMM). Virtualization layer 1250 can present a virtual operating platform that appears like networking hardware to virtual machine 1240.

As shown in FIG. 12, hardware 1230 can be a standalone network node with generic or specific components. Hardware 1230 can comprise antenna 12225 and can implement some functions via virtualization. Alternatively, hardware 1230 can be part of a larger cluster of hardware (e.g., such as in a data center or customer premise equipment (CPE)) where many hardware nodes work together and are managed via management and orchestration (MANO) 12100, which, among others, oversees lifecycle management of applications 1220.

Virtualization of the hardware is in some contexts referred to as network function virtualization (NFV). NFV can be used to consolidate many network equipment types onto industry standard high-volume server hardware, physical switches, and physical storage, which can be located in data centers, and customer premise equipment.

In the context of NFV, virtual machine 1240 can be a software implementation of a physical machine that runs programs as if they were executing on a physical, non-virtualized machine. Each of virtual machines 1240, and that part of hardware 1230 that executes that virtual machine, be it hardware dedicated to that virtual machine and/or hardware shared by that virtual machine with others of the virtual machines 1240, forms a separate virtual network elements (VNE).

Still in the context of NFV, Virtual Network Function (VNF) is responsible for handling specific network functions that run in one or more virtual machines 1240 on top of hardware networking infrastructure 1230 and corresponds to application 1220 in FIG. 12.

In some embodiments, one or more radio units 12200 that each include one or more transmitters 12220 and one or more receivers 12210 can be coupled to one or more antennas 12225. Radio units 12200 can communicate directly with hardware nodes 1230 via one or more appropriate network interfaces and can be used in combination with the virtual components to provide a virtual node with radio capabilities, such as a radio access node or a base station. Nodes arranged in this manner can also communicate with one or more UEs, such as described elsewhere herein.

In some embodiments, some signaling can be performed via control system 12230, which can alternatively be used for communication between the hardware nodes 1230 and radio units 12200.

Figure 13:
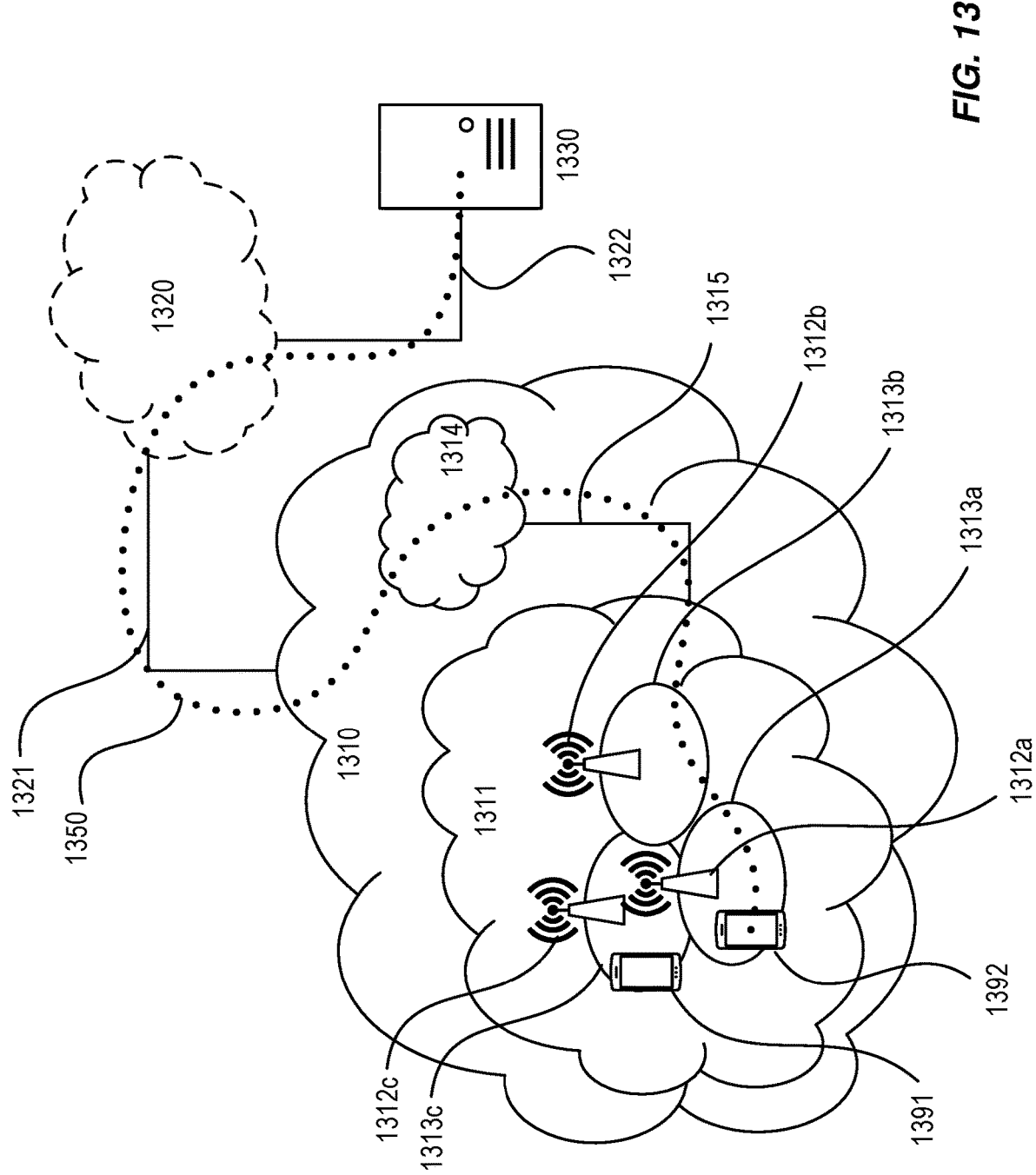
FIGS. 13-14 are block diagrams of various exemplary communication systems and/or networks, according to various exemplary embodiments of the present disclosure.

With reference to FIG. 13, in accordance with an embodiment, a communication system includes telecommunication network 1310, such as a 3GPP-type cellular network, which comprises access network 1311, such as a radio access network, and core network 1314. Access network 1311 comprises a plurality of base stations 1312*a*, 1312*b*, 1312*c*, such as NBs, eNBs, gNBs or other types of wireless access points, each defining a corresponding coverage area 1313*a*, 1313*b*, 1313*c*. Each base station 1312*a*, 1312*b*, 1312*c* is connectable to core network 1314 over a wired or wireless connection 1315. A first UE 1391 located in coverage area 1313*c* can be configured to wirelessly connect to, or be paged by, the corresponding base station 1312*c*. A second UE 1392 in coverage area 1313*a* is wirelessly connectable to the corresponding base station 1312*a*. While a plurality of UEs 1391, 1392 are illustrated in this example, the disclosed embodiments are equally applicable to a situation where a sole UE is in the coverage area or where a sole UE is connecting to the telecommunication network 1310.

Telecommunication network 1310 is itself connected to host computer 1330, which can be embodied in the hardware and/or software of a standalone server, a cloud-implemented server, a distributed server or as processing resources in a server farm. Host computer 1330 can be under the ownership or control of a service provider or can be operated by the service provider or on behalf of the service provider. Connections 1321 and 1322 between telecommunication network 1310 and host computer 1330 can extend directly from core network 1314 to host computer 1330 or can go via an optional intermediate network 1320. Intermediate network 1320 can be one of, or a combination of more than one of, a public, private or hosted network; intermediate network 1320, if any, can be a backbone network or the Internet; in particular, intermediate network 1320 can comprise two or more sub-networks (not shown).

The communication system of FIG. 13 as a whole enables connectivity between the connected UEs 1391, 1392 and host computer 1330. The connectivity can be described as an over-the-top (OTT) connection 1350. Host computer 1330 and the connected UEs 1391, 1392 are configured to communicate data and/or signaling via OTT connection 1350, using access network 1311, core network 1314, any intermediate network 1320 and possible further infrastructure (not shown) as intermediaries. OTT connection 1350 can be transparent in the sense that the participating communication devices through which OTT connection 1350 passes are unaware of routing of uplink and downlink communications. For example, base station 1312 may not or need not be informed about the past routing of an incoming downlink communication with data originating from host computer 1330 to be forwarded (e.g., handed over) to a connected UE 1391. Similarly, base station 1312 need not be aware of the future routing of an outgoing uplink communication originating from the UE 1391 towards the host computer 1330.

Example implementations, in accordance with an embodiment, of the UE, base station and host computer discussed in the preceding paragraphs will now be described with reference to FIG. 14. In communication system 1400, host computer 1410 comprises hardware 1415 including communication interface 1416 configured to set up and maintain a wired or wireless connection with an interface of a different communication device of communication system 1400. Host computer 1410 further comprises processing circuitry 1418, which can have storage and/or processing capabilities. In particular, processing circuitry 1418 can comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418. Software 1411 includes host application 1412. Host application 1412 can be operable to provide a service to a remote user, such as UE 1430 connecting via OTT connection 1450 terminating at UE 1430 and host computer 1410. In providing the service to the remote user, host application 1412 can provide user data which is transmitted using OTT connection 1450.

Communication system 1400 can also include base station 1420 provided in a telecommunication system and comprising hardware 1425 enabling it to communicate with host computer 1410 and with UE 1430. Hardware 1425 can include communication interface 1426 for setting up and maintaining a wired or wireless connection with an interface of a different communication device of communication system 1400, as well as radio interface 1427 for setting up and maintaining at least wireless connection 1470 with UE 1430 located in a coverage area (not shown in FIG. 14) served by base station 1420. Communication interface 1426 can be configured to facilitate connection 1460 to host computer 1410. Connection 1460 can be direct, or it can pass through a core network (not shown in FIG. 14) of the telecommunication system and/or through one or more intermediate networks outside the telecommunication system. In the embodiment shown, hardware 1425 of base station 1420 can also include processing circuitry 1428, which can comprise one or more programmable processors, application-specific integrated circuits, field programmable gate arrays or combinations of these (not shown) adapted to execute instructions.

Base station 1420 also includes software 1421 stored internally or accessible via an external connection. For example, software 1421 can include program instructions (also referred to as a computer program product) that, when executed by processing circuitry 1428, can configure base station 1420 to perform operations corresponding to various exemplary methods (e.g., procedures) described herein.

Communication system 1400 can also include UE 1430 already referred to, whose hardware 1435 can include radio interface 1437 configured to set up and maintain wireless connection 1470 with a base station serving a coverage area in which UE 1430 is currently located. Hardware 1435 of UE 1430 can also include processing circuitry 1438, which can comprise one or more programmable processors, application-specific integrated circuits, field programmable gate arrays or combinations of these (not shown) adapted to execute instructions.

UE 1430 also includes software 1431, which is stored in or accessible by UE 1430 and executable by processing circuitry 1438. Software 1431 includes client application 1432. Client application 1432 can be operable to provide a service to a human or non-human user via UE 1430, with the support of host computer 1410. In host computer 1410, an executing host application 1412 can communicate with the executing client application 1432 via OTT connection 1450 terminating at UE 1430 and host computer 1410. In providing the service to the user, client application 1432 can receive request data from host application 1412 and provide user data in response to the request data. OTT connection 1450 can transfer both the request data and the user data. Client application 1432 can interact with the user to generate the user data that it provides. Software 1431 can also include program instructions (also referred to as a computer program product) that, when executed by processing circuitry 1438, can configure UE 1430 to perform operations corresponding to various exemplary methods (e.g., procedures) described herein.

Figure 14:
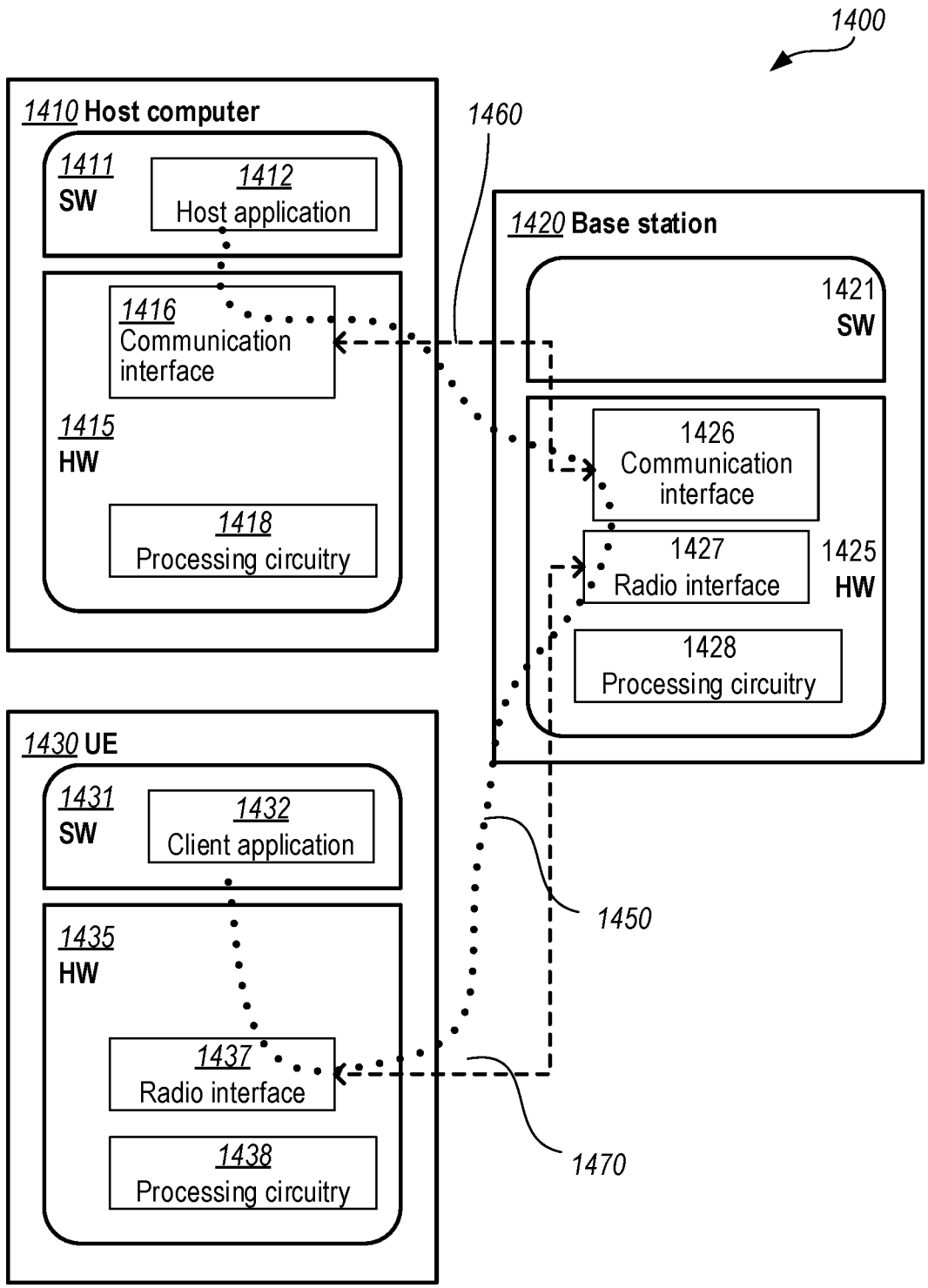

As an example, host computer 1410, base station 1420 and UE 1430 illustrated in FIG. 14 can be similar or identical to host computer 1230, one of base stations 1212a, 1212b, 1212c and one of UEs 1291, 1292 of FIG. 12, respectively. This is to say, the inner workings of these entities can be as shown in FIG. 14 and independently, the surrounding network topology can be that of FIG. 12.

In FIG. 14, OTT connection 1450 has been drawn abstractly to illustrate the communication between host computer 1410 and UE 1430 via base station 1420, without explicit reference to any intermediary devices and the precise routing of messages via these devices. Network infrastructure can determine the routing, which it can be configured to hide from UE 1430 or from the service provider operating host computer 1410, or both. While OTT connection 1450 is active, the network infrastructure can further take decisions by which it dynamically changes the routing (e.g., on the basis of load balancing consideration or reconfiguration of the network).

Wireless connection 1470 between UE 1430 and base station 1420 is in accordance with the teachings of the embodiments described throughout this disclosure. One or more of the various embodiments improve the performance of OTT services provided to UE 1430 using OTT connection 1450, in which wireless connection 1470 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 1450 between host computer 1410 and UE 1430, in response to variations in the measurement results. The measurement procedure and/or the network functionality for reconfiguring OTT connection 1450 can be implemented in software 1411 and hardware 1415 of host computer 1410 or in software 1431 and hardware 1435 of UE 1430, or both. In embodiments, sensors (not shown) can be deployed in or in association with communication devices through which OTT connection 1450 passes; the sensors can participate in the measurement procedure by supplying values of the monitored quantities exemplified above, or supplying values of other physical quantities from which software 1411, 1431 can compute or estimate the monitored quantities. The reconfiguring of OTT connection 1450 can include message format, retransmission settings, preferred routing etc.; the reconfiguring need not affect base station 1420, and it can be unknown or imperceptible to base station 1420. Such procedures and functionalities can be known and practiced in the art. In certain embodiments, measurements can involve proprietary UE signaling facilitating host computer 1410's measurements of throughput, propagation times, latency and the like. The measurements can be implemented in that software 1411 and 1431 causes messages to be transmitted, in particular empty or 'dummy' messages, using OTT connection 1450 while it monitors propagation times, errors, etc.

FIG. 15 is a flowchart illustrating an exemplary method and/or procedure implemented in a communication system, in accordance with one embodiment. The communication system includes a host computer, a base station and a UE which, in some exemplary embodiments, can be those described with reference to other figures herein. For simplicity of the present disclosure, only drawing references to FIG. 15 will be included in this section. In step 1510, the host computer provides user data. In substep 1511 (which can be optional) of step 1510, the host computer provides the user data by executing a host application. In step 1520, the host computer initiates a transmission carrying the user data to the UE. In step 1530 (which can be optional), the base station transmits to the UE the user data which was carried in the transmission that the host computer initiated, in accordance with the teachings of the embodiments described throughout this disclosure. In step 1540 (which can also be optional), the UE executes a client application associated with the host application executed by the host computer.

FIG. 16 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 16 will be included in this section. In step 1610 of the method, the host computer provides user data. In an optional substep (not shown) the host computer provides the user data by executing a host application. In step 1620, the host computer initiates a transmission carrying the user data to the UE. The transmission can pass via the base station, in accordance with the teachings of the embodiments described throughout this disclosure. In step 1630 (which can be optional), the UE receives the user data carried in the transmission.

FIG. 17 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 17 will be included in this section. In step 1710 (which can be optional), the UE receives input data provided by the host computer. Additionally or alternatively, in step 1720, the UE provides user data. In substep 1721 (which can be optional) of step 1720, the UE provides the user data by executing a client application. In substep 1711 (which can be optional) of step 1710, the UE executes a client application which provides the user data in reaction to the received input data provided by the host computer. In providing the user data, the executed client application can further consider user input received from the user. Regardless of the specific manner in which the user data was provided, the UE initiates, in substep 1730 (which can be optional), transmission of the user data to the host computer. In step 1740 of the method, the host computer receives the user data transmitted from the UE, in accordance with the teachings of the embodiments described throughout this disclosure.

FIG. 18 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 18 will be included in this section. In step 1810 (which can be optional), in accordance with the teachings of the embodiments described throughout this disclosure, the base station receives user data from the UE. In step 1820 (which can be optional), the base station initiates transmission of the received user data to the host computer. In step 1830 (which can be optional), the host computer receives the user data carried in the transmission initiated by the base station.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Furthermore, functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

Example embodiments of the techniques and apparatus described herein include, but are not limited to, the following enumerated embodiments:

A1. A method for a session management function (SMF) in a communication network, the method comprising:
  determining that a first data path, for a PDU session between an application client and a first edge application server (EAS), should be relocated from a first local PDU session anchor (PSA) and a first uplink classifier and branching point (ULCL/BP) to a second PSA and a second ULCL/BP;
  determining an edge client subnet (ECS) associated with the second PSA;
  sending, to an application function (AF) associated with the application client, a notification of the relocation, wherein the notification includes an identifier of the ECS and a data network access identifier (DNAI) associated with the second PSA;
  receiving, from the AF, a response that includes an identifier of a second EAS and the DNAI associated with the second PSA; and
  based on the response, establishing a second data path for the PDU session between the application client and the second EAS via the second PSA and the second ULCL/BP.

A2. The method of embodiment A1, wherein the DNAI has a value that indicates that the ECS is included in the notification and should be used by the AF to select the second EAS.

A3. The method of any of embodiments A1-A2, further comprising sending, to the AF, an identifier of the second data path.

A4. The method of any of embodiments A1-A3, further comprising:
  initiating a timer upon establishing the second data path;
  maintaining the first data path to the first EAS while the timer is running; and removing the first data path to the first EAS upon expiration of the timer.

A5. The method of any of embodiments A1-A4, wherein determining that the first data path should be relocated is based on a domain name service (DNS) query by the application client.

A6. The method of any of embodiments A1-A5, wherein the first and second EAS are associated with respective first and second ranges of IP addresses, associated with an application server, that are managed together.

A7. The method of any of embodiments A1-A6, wherein:
  the notification is sent to the AF via a network exposure function (NEF) in the communication network; and
  the response is received from the AF via the NEF.

B1. A method for an application function (AF) in a communication network, the method comprising:
  receiving, from a session management function (SMF) in the communication network, a notification of a relocation of a first data path, for a PDU session between an application client and a first edge application server (EAS), from a first local PDU session anchor (PSA) and a first uplink classifier and branching point (ULCL/BP) to a second PSA and a second ULCL/BP, wherein the notification includes:
    an identifier of an edge client subnet (ECS) associated with the second PSA; and a data network access identifier (DNAI) associated with the second PSA;
  determining a second EAS based on the ECS; and
  sending, to the SMF, a response that includes an identifier of a second EAS and the DNAI associated with the second PSA.

B2. The method of embodiment B1, wherein the DNAI has a value that indicates that the ECS is included in the notification and should be used by the AF to select the second EAS.

B3. The method of any of embodiments B1-B2, further comprising receiving, from the SMF, an identifier of the second data path.

B4. The method of any of embodiments B1-B3, wherein:
  determining the second EAS comprising sending a domain name service (DNS) query that includes the identifier of the ECS; and
  the identifier of the second EAS includes an IP address of the second EAS received in response to the DNS query.

B5. The method of any of embodiments B1-B4, wherein the first and second EAS are associated with respective first and second ranges of IP addresses, associated with an application server, that are managed together.

B6. The method of any of embodiments B1-B5, wherein:
the notification is received from the SMF via a network exposure function (NEF) in the communication network; and
the response is sent to the SMF via the NEF.

C1. A session management function (SMF) of a communication network, the SMF comprising:
interface circuitry configured to communicate with at least an application function (AF) in the communication network; and
processing circuitry operably coupled to the interface circuitry, whereby the processing circuitry and interface circuitry are configured to perform operations corresponding to any of the methods of embodiments A1-A7.

C2. A session management function (SMF) of a communication network, the SMF being arranged to perform operations corresponding to any of the methods of embodiments A1-A7.

C3. A non-transitory, computer-readable medium storing computer-executable instructions that, when executed by processing circuitry associated with a session management function (SMF) of a communication network, configure the SMF to perform operations corresponding to any of the methods of embodiments A1-A7.

C4. A computer program product comprising computer-executable instructions that, when executed by processing circuitry associated with a session management function (SMF) of a communication network, configure the SMF to perform operations corresponding to any of the methods of embodiments A1-A7.

D1. An application function (AF) of a communication network, the AF comprising:
interface circuitry configured to communicate with at least a session management function (SMF) in the communication network; and
processing circuitry operably coupled to the interface circuitry, whereby the processing circuitry and interface circuitry are configured to perform operations corresponding to any of the methods of embodiments B1-B6.

D2. An application function (AF) of a communication network, the AF being arranged to perform operations corresponding to any of the methods of embodiments B1-B6.

D3. A non-transitory, computer-readable medium storing computer-executable instructions that, when executed by processing circuitry associated with an application function (AF) of a communication network, configure the AF to perform operations corresponding to any of the methods of embodiments B1-B6.

D4. A computer program product comprising computer-executable instructions that, when executed by processing circuitry associated with an application function (AF) of a communication network, configure the AF to perform operations corresponding to any of the methods of embodiments B1-B6.

The invention claimed is:

1. A method performed by a session management function (SMF) in a communication network, the method comprising:
determining that a first data path for a Packet Data Unit (PDU) session between an application client and a first edge application server (EAS) should be relocated from a first local PDU session anchor (PSA) and a first uplink classifier and branching point (ULCL/BP) to a second PSA and a second ULCL/BP;
determining an edge client subnet (ECS) associated with the second PSA;
sending, to an application function (AF) associated with the application client, a notification of the relocation, wherein the notification includes an identifier of the ECS and a data network access identifier (DNAI) associated with the second PSA;
receiving, from the AF, a response that includes an identifier of a second EAS and the DNAI associated with the second PSA; and
based on the response, establishing a second data path for the PDU session between the application client and the second EAS via the second PSA and the second ULCL/BP.

2. The method of claim 1, wherein the DNAI has a value that indicates that the ECS is included in the notification and should be used by the AF to select the second EAS.

3. The method of claim 1, further comprising sending, to the AF, an identifier of the second data path.

4. The method of claim 1, further comprising:
initiating a timer upon establishing the second data path;
maintaining the first data path to the first EAS while the timer is running; and
removing the first data path to the first EAS upon expiration of the timer.

5. The method of claim 1, wherein determining that the first data path should be relocated is based on a domain name service (DNS) query by the application client.

6. The method of claim 1, wherein the first EAS and the second EAS are associated with respective first and second ranges of IP addresses, associated with an application server, that are managed together.

7. The method of claim 1, wherein:
the notification is sent to the AF via a network exposure function (NEF) in the communication network; and
the response is received from the AF via the NEF.

8. A method performed by an application function (AF) in a communication network, the method comprising:
receiving, from a session management function (SMF) in the communication network, a notification of a relocation of a first data path, for a packet data Unit (PDU) session between an application client and a first edge application server (EAS) from a first local PDU session anchor (PSA) and a first uplink classifier and branching point (ULCL/BP) to a second PSA and a second ULCL/BP, wherein the notification includes:
an identifier of an edge client subnet (ECS) associated with the second PSA, and a data network access identifier (DNAI) associated with the second PSA;
determining a second EAS based on the ECS; and
sending, to the SMF, a response that includes an identifier of a second EAS and the DNAI associated with the second PSA.

9. The method of claim 8, wherein the DNAI has a value that indicates that the ECS is included in the notification and should be used by the AF to select the second EAS.

10. The method of claim 8, further comprising receiving, from the SMF, an identifier of the second data path.

11. The method of claim 8, wherein:
determining the second EAS comprises sending a domain name service (DNS) query that includes the identifier of the ECS; and
the identifier of the second EAS includes an IP address of the second EAS received in response to the DNS query.

12. The method of claim 8, wherein the first EAS and second EAS are associated with respective first and second ranges of IP addresses, associated with an application server, that are managed together.

13. The method claim 8, wherein:
- the notification is received from the SMF via a network exposure function (NEF) in the communication network; and
- the response is sent to the SMF via the NEF.

14. A network node configured to operate as a session management function (SMF) in a communication network, the network node comprising:
- interface circuitry configured to communicate with at least an application function (AF) associated with an application client; and
- processing circuitry operably coupled to the interface circuitry, whereby the processing circuitry and the interface circuitry are configured to:
  - determine that a first data path for a Packet Data Unit (PDU) session between the application client and a first edge application server (EAS) should be relocated from a first local PDU session anchor (PSA) and a first uplink classifier and branching point (ULCL/BP) to a second PSA and a second ULCL/BP;
  - determine an edge client subnet (ECS) associated with the second PSA;
  - send, to the AF associated with the application client, a notification of the relocation, wherein the notification includes an identifier of the ECS and a data network access identifier (DNAI) associated with the second PSA;
  - receive, from the AF, a response that includes an identifier of a second EAS and the DNAI associated with the second PSA; and
  - based on the response, establish a second data path for the PDU session between the application client and the second EAS via the second PSA and the second ULCL/BP.

15. The network node of claim 14, wherein the DNAI has a value that indicates that the ECS is included in the notification and should be used by the AF to select the second EAS.

16. The network node of claim 14, wherein the processing circuitry and the interface circuitry are further configured to:
- initiate a timer upon establishing the second data path;
- maintain the first data path to the first EAS while the timer is running; and
- remove the first data path to the first EAS upon expiration of the timer.

17. The network node of claim 14, wherein the processing circuitry and the interface circuitry are configured to determine that the first data path should be relocated based on a domain name service (DNS) query by the application client.

18. The network node of claim 14, wherein one or more of the following applies:
- the first EAS and the second EAS are associated with respective first and second ranges of IP addresses, associated with an application server, that are managed together; and
- the notification is sent to the AF via a network exposure function (NEF) in the communication network and the response is received from the AF via the NEF.

19. A network node configured to operate as an application function (AF) in a communication network, the network node comprising:
- interface circuitry configured to communicate with at least a session management function (SMF) in the communication network; and
- processing circuitry operably coupled to the interface circuitry, whereby the processing circuitry and the interface circuitry are configured to perform operations corresponding to the method of claim 8.

20. The network node of claim 19, wherein the DNAI has a value that indicates that the ECS is included in the notification and should be used by the AF to select the second EAS.

* * * * *